US012558738B2

(12) United States Patent
Seo et al.

(10) Patent No.: US 12,558,738 B2
(45) Date of Patent: Feb. 24, 2026

(54) ROTATING TOOL, JOINING DEVICE, AND JOINING METHOD

(71) Applicant: NIPPON LIGHT METAL COMPANY, LTD., Tokyo (JP)

(72) Inventors: Nobushiro Seo, Shizuoka (JP); Shingo Koizumi, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 18/706,703

(22) PCT Filed: Oct. 4, 2022

(86) PCT No.: PCT/JP2022/037074
§ 371 (c)(1),
(2) Date: May 1, 2024

(87) PCT Pub. No.: WO2023/079889
PCT Pub. Date: May 11, 2023

(65) Prior Publication Data
US 2025/0058404 A1      Feb. 20, 2025

(30) Foreign Application Priority Data

Nov. 5, 2021      (JP) ................................. 2021-181165

(51) Int. Cl.
B23K 20/12             (2006.01)
(52) U.S. Cl.
CPC ........ B23K 20/1255 (2013.01); B23K 20/123 (2013.01)
(58) Field of Classification Search
CPC .. B23K 20/1255; B23K 20/123; B23K 20/12; B23K 20/122–1295

(Continued)

(56) References Cited

U.S. PATENT DOCUMENTS 8,757,468 B1      6/2014   Burton et al.
12,145,211 B2 *  11/2024   Seo .................... B23K 20/1255
(Continued)

FOREIGN PATENT DOCUMENTS

CA          3176331 A1 * 10/2021   ........... B23K 20/127
CN          106670642 A  *  5/2017
(Continued)

OTHER PUBLICATIONS

International Search Report and Written Opinion for International Patent Application No. PCT/JP2022/037074 (Dec. 27, 2022).

*Primary Examiner* — Kiley S Stoner

(74) *Attorney, Agent, or Firm* — Merchant & Gould P.C.

(57)             ABSTRACT

Provided is a rotating tool used in a joining device configured to perform friction stir welding of to-be-joined members, the rotating tool including: a main body; a stir pin configured to perform friction stirring on the to-be-joined members; a shoulder configured to press the to-be-joined members, the stir pin and the shoulder forming an assembly; a first elastic member configured to bias the assembly toward a distal end side of the stir pin; and a first restriction member configured to restrict movement of the assembly toward a base end side in the axial direction of the rotating shaft, and the first restriction member restricts the movement of the assembly such that an amount of deformation occurring in the first elastic member with the movement of the assembly does not exceed a maximum allowable amount of the first elastic member.

12 Claims, 18 Drawing Sheets

(58) Field of Classification Search
USPC ............................. 228/112.1–114.5, 2.1–2.3
See application file for complete search history.

(56)                    References Cited

U.S. PATENT DOCUMENTS

| 12,280,442 | B2 * | 4/2025 | Seo ...................... B23K 20/123 |
| 2014/0069985 | A1 | 3/2014 | Okada et al. |
| 2018/0099349 | A1 * | 4/2018 | Packer .............. B23K 20/1255 |

FOREIGN PATENT DOCUMENTS

| CN | 108971743 | A | | 12/2018 | |
| CN | 109048044 | A | * | 12/2018 | ......... B23K 20/1255 |
| CN | 112548315 | A | * | 3/2021 | ............. B23K 20/12 |
| CN | 113226621 | A | * | 8/2021 | ........... B23K 20/122 |
| CN | 114222640 | A | * | 3/2022 | |
| CN | 114589393 | A | * | 6/2022 | |
| DE | 202008001344 | U1 | * | 5/2008 | ........... B23K 20/125 |
| EP | 1872893 | A1 | * | 1/2008 | ........... B23K 20/125 |
| EP | 2596898 | A1 | * | 5/2013 | ............. B23K 20/10 |
| JP | 2003-260572 | A | | 9/2003 | |
| JP | 2012-196681 | A | | 10/2012 | |
| WO | WO-2022118589 | A1 | * | 6/2022 | ......... B23K 20/1225 |
| WO | WO-2022118590 | A1 | * | 6/2022 | ........... B23K 20/125 |
| WO | WO-2022118591 | A1 | * | 6/2022 | ........... B23K 20/123 |
| WO | WO-2023079888 | A1 | * | 5/2023 | ............. B23K 20/12 |
| WO | WO-2023079889 | A1 | * | 5/2023 | ............. B23K 20/12 |
| WO | WO-2023079890 | A1 | * | 5/2023 | ............. B23K 20/12 |

* cited by examiner

ROTATING TOOL, JOINING DEVICE, AND JOINING METHOD

This application is a National Stage Application of PCT/JP2022/037074, filed Oct. 4, 2022, which claims the benefit of priority to Japanese Patent Application No. 2021-181165, filed Nov. 5, 2021, and which applications are incorporated herein by reference. To the extent appropriate, a claim of priority is made to each of the above disclosed applications.

TECHNICAL FIELD

The present invention relates to a rotating tool, a joining device, and a joining method used in friction stir welding.

BACKGROUND ART

As joining devices for performing friction stir welding, there are known a joining device that performs load control to control a plunging amount of a rotating tool into to-be-joined members and a joining device that performs position control to control the plunging amount. The load control has been mainly used in a joining device achieved by a robot (robot arm), and the position control has been mainly used in a joining device achieved by a machining center (MC).

The joining device that performs the load control includes, for example, a device disclosed in Patent Literature 1. The joining device of Patent Literature 1 is a joining device that controls a press-in depth of a shoulder member or a pin member into to-be-joined objects to obtain good joining quality at preferable accuracy depending on joining conditions. This joining device controls the position of the pin member relative to the shoulder member based on a press-in reference point set in a press-in reference point setter to control the press-in depth. The joining device includes an applied pressure detector, the press-in reference point setter, a tool drive controller, and the like to perform the above-mentioned control. Moreover, a tool driver includes a rotating driver, a pin driver, a shoulder driver, a clamp driver (elastic member: coil spring), and the like.

CITATION LIST

Patent Literature

Patent Literature 1: JP2012-196681A

SUMMARY OF INVENTION

Technical Problem

Since the joining device of Patent Literature 1 performs the load control, the joining device has a complicated structure and is expensive. Accordingly, in recent years, there is a demand for a rotating tool that can perform the load control and that can be fitted to a relatively-low cost MC capable of performing only the position control.

In view of this, an object of the present invention is to provide a rotating tool that can perform the load control in a state where the rotating tool is attached to a machining center, a joining device, and a joining method.

Solution to Problem

The present invention for solving the above problems is a rotating tool used in a joining device configured to perform friction stir welding of to-be-joined members, the rotating tool including: a main body including a fixation portion that is attached and fixed to the joining device and a rotating shaft that transmits rotating force from the joining device; a stir pin arranged in the main body to be rotatable by receiving the rotating force from the main body and be movable in an axial direction of the rotating shaft, the stir pin configured to perform friction stirring on the to-be-joined members by being inserted into the to-be-joined members; a shoulder formed of a body separate from the stir pin and provided in the main body to receive no rotating force from the main body and be movable in the axial direction of the rotating shaft, the shoulder configured to press the to-be-joined members in a state where the shoulder is in contact with the to-be-joined members, the stir pin and the shoulder forming an assembly by being attached to be rotatable relative to each other and to move integrally in the axial direction of the rotating shaft; a first elastic member configured to bias the assembly toward a distal end side of the stir pin in the axial direction of the rotating shaft; and a first restriction member configured to restrict movement of the assembly toward a base end side in the axial direction of the rotating shaft, and the first restriction member restricts the movement of the assembly such that an amount of deformation occurring in the first elastic member with the movement of the assembly does not exceed a maximum allowable amount of the first elastic member.

Moreover, the rotating tool is preferably configured such that the main body further includes a holder that has a hollow tube shape and that is attached to the rotating shaft and a slide shaft that is housed in a center portion of the holder to be slidable in a rotating shaft direction and that rotates in synchronization with the holder, the assembly is provided at a distal end of the slide shaft, the slide shaft is biased toward a distal end side of the assembly via the first elastic member, and the first restriction member restricts movement of the slide shaft toward the base end side in the axial direction of the rotating shaft.

Furthermore, the rotating tool preferably further includes a second elastic member configured to bias the shoulder toward the distal end side of the stir pin in the axial direction of the rotating shaft; and a second restriction member configured to restrict movement of the shoulder toward the base end side in the axial direction of the rotating shaft, and is preferably configured such that the second restriction member restricts the movement of the shoulder such that an amount of deformation occurring in the second elastic member with the movement of the shoulder does not exceed a maximum allowable amount of the second elastic member.

Moreover, the rotating tool is preferably configured such that the first restriction member is provided in the holder, and the movement of the slide shaft is restricted by contact of a base end portion of the slide shaft and a bottom portion of the holder on the base end side with the first restriction member that occurs with the movement of the slide shaft.

Furthermore, the rotating tool is preferably configured such that the first restriction member is provided in a bottom portion of the holder on the base end side, and the movement of the slide shaft is restricted by contact of a base end portion of the slide shaft with the first restriction member that occurs with the movement of the slide shaft.

Moreover, the rotating tool is preferably configured such that the first restriction member is provided in a base end portion of the slide shaft, and the movement of the slide shaft is restricted by contact of a bottom portion of the holder on the base end side with the first restriction member that occurs with the movement of the slide shaft.

Furthermore, the rotating tool is preferably configured such that the first restriction member is provided on an outer peripheral surface of the slide shaft, and the movement of the slide shaft is restricted by contact of the first restriction member with an intermediate portion of the holder that occurs with the movement of the slide shaft.

Moreover, the rotating tool is preferably configured such that the first restriction member is provided on an outer peripheral surface of the slide shaft, and the movement of the slide shaft is restricted by contact of the first restriction member with a distal end portion of the holder that occurs with the movement of the slide shaft.

Furthermore, the rotating tool is preferably configured such that the first restriction member is provided in a distal end portion of the slide shaft, and the movement of the slide shaft is restricted by contact of the first restriction member with a distal end portion of the holder that occurs with the movement of the slide shaft.

Moreover, the rotating tool is preferably configured such that the stir pin is the first restriction member, and the movement of the slide shaft is restricted by contact of the stir pin with a distal end portion of the holder that occurs with the movement of the slide shaft.

Moreover, the present invention is a joining device including: the rotating tool according to any one of claims 1 to 10; a power unit configured to output the rotating force to be transmitted to the rotating shaft of the rotating tool; and a position controller configured to hold the fixation portion of the rotating tool and perform position control of the rotating tool, and the joining device performs the friction stir welding on the to-be-joined members by causing the position controller to move the rotating tool such that the rotating tool is located at a predetermined height position relative to the to-be-joined members, and insert the stir pin into the to-be-joined members.

Furthermore, the friction stir welding is performed on the to-be-joined members by moving the rotating tool according to any one of claims 1 to 10 such that the rotating tool is located at a predetermined height position relative to the to-be-joined members, and inserting the stir pin into the to-be-joined members.

Advantageous Effects of Invention

According to the rotating tool, the joining device, and the joining method in the present invention, load control using the elastic member can be performed. Moreover, according to the rotating tool, the joining device, and the joining method in the present invention, it is possible to insert the stir pin into relatively-hard to-be-joined members while using the elastic members.

DESCRIPTION OF EMBODIMENTS

Embodiments of the present invention are explained with reference to the drawings as appropriate. The present invention is not limited only to the following embodiments. Moreover, some or all of components in the embodiments can be combined as appropriate. Furthermore, the drawings are drawings for conceptually explaining the present invention, and dimensions of: shown components and ratios of the dimensions may vary from actual dimensions and ratios.

1. First Embodiment

[1-1. Rotating Tool]

Figure 1:
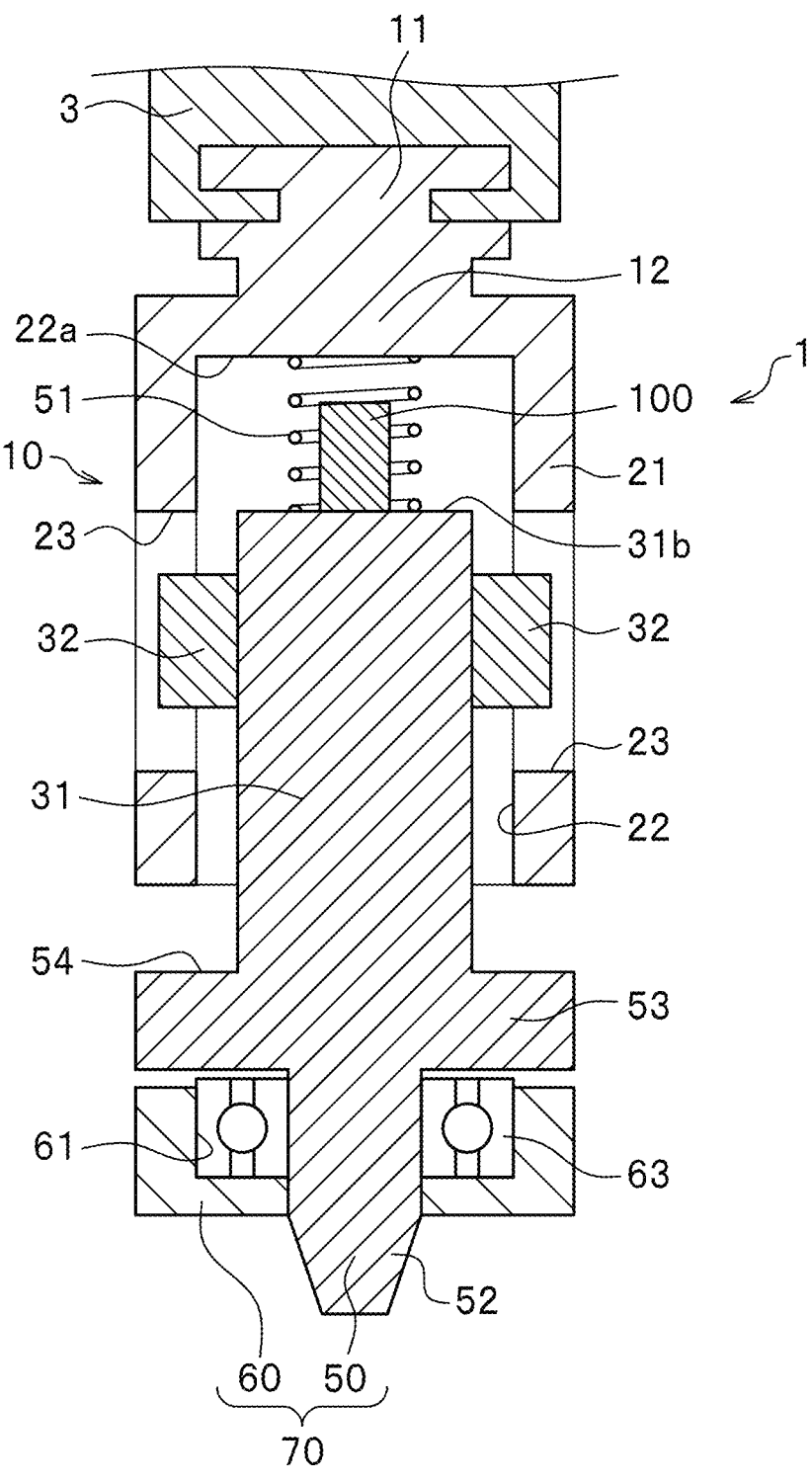
FIG. 1 is a cross-sectional view showing a rotating tool according to a first embodiment of the present invention.

First, a configuration of a rotating tool according to the present embodiment is explained. As shown in FIG. 1, the rotating tool 1 according to the present embodiment is a tool used in a joining device 3 (see FIG. 1) that performs friction stir welding of to-be-joined members 2 (see FIG. 5), and is inserted into a butt portion of the to-be-joined members 2 while being rotated. The rotating tool 1 as described above includes a main body 10, a stir pin 50, a shoulder 60, a first elastic member 51, and a first restriction member 100. The stir pin 50 and the shoulder 60 are attached to be rotatable relative to each other and to move integrally in an axial direction of a rotating shaft, and form an assembly 70. Furthermore, the rotating tool 1 includes a holding unit 80 (see FIG. 3).

<Main Body>

The main body 10 is a portion fixed to the joining device 3 such as, for example, a machining center, and includes a fixation portion 11 and a rotating shaft 12. The fixation portion 11 is portion configured to be attached and fixed to the joining device 3, and has a cylindrical shape. The fixation portion 11 is a chuck mechanism, and can be detachably fixed to the joining device by working in cooperation with a chuck mechanism that is provided in the joining device 3 and that forms a pair with the fixation portion 11. Examples of the chuck mechanisms include a groove provided in the fixation portion 11 and a claw provided in the joining device 3 and configured to clamp the fixation portion 11 by being fitted to the groove on the fixation portion 11 side. The rotating shaft 12 is provided by being coupled to an end side (lower side in FIG. 1) of the fixation portion 11 other than the side where the fixation portion 11 is attached to the joining device 3. The rotating shaft 12 has a cylindrical column shape. The rotating shaft 12 is a portion that transmits rotating force from the joining device 3 to the stir pin 50, and is coupled to a rotating shaft (not shown) of the joining device 3 via the fixation portion 11.

Figure 2:
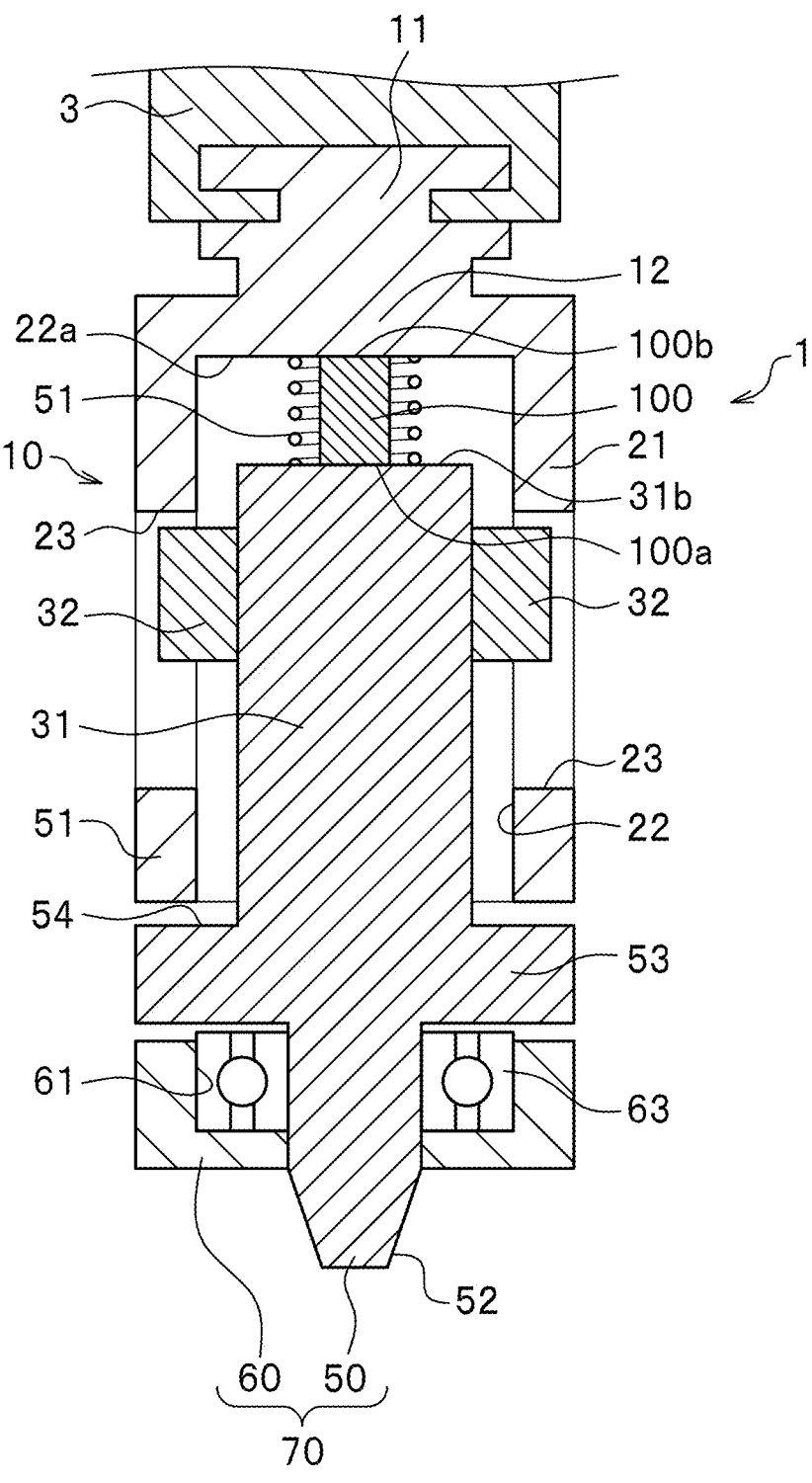
FIG. 2 is a cross-sectional view showing a most-contracted state of the rotating tool according to the first embodiment.
Figure 3:
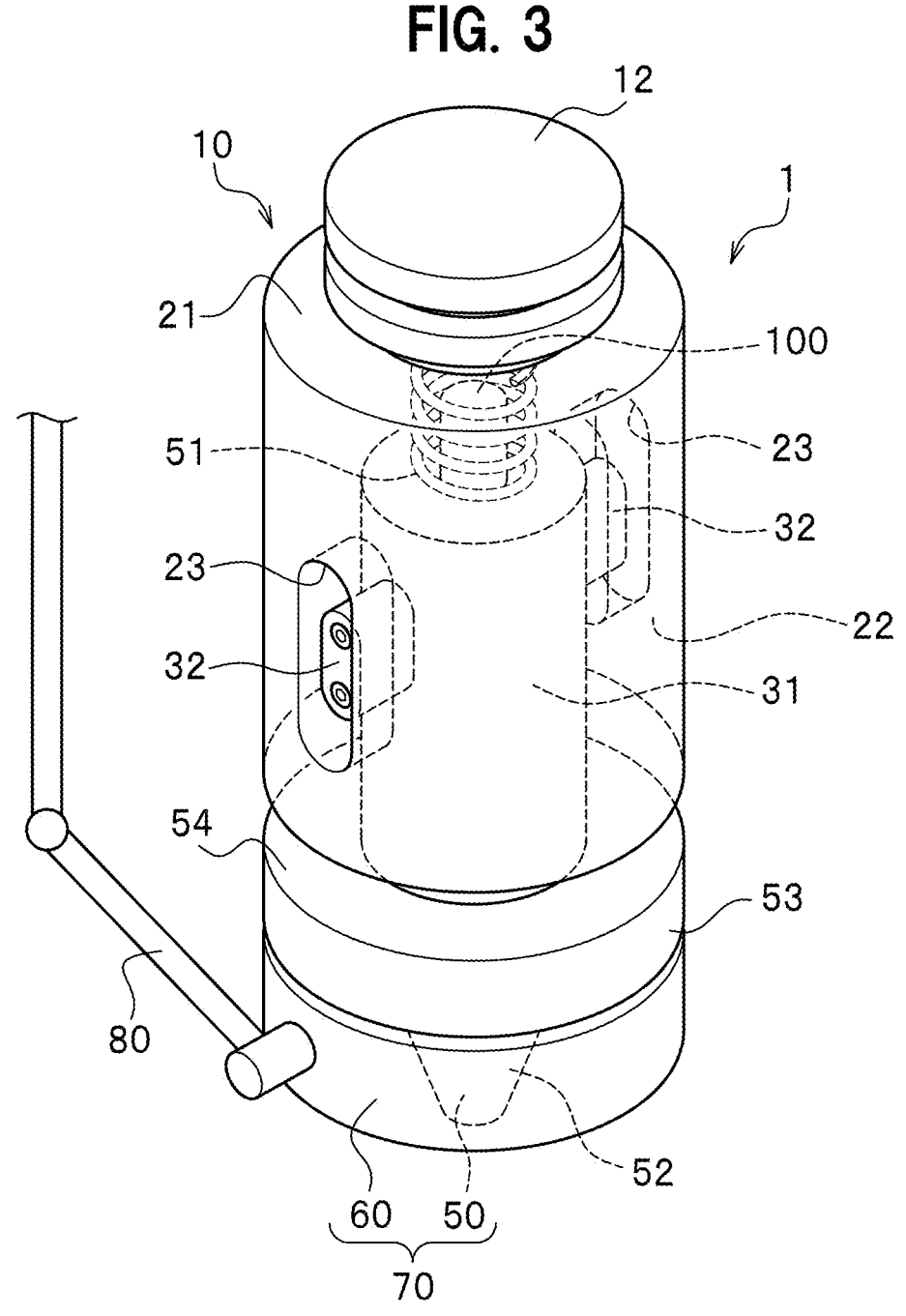
FIG. 3 is a perspective view showing the rotating tool according to the first embodiment.
Figure 4:
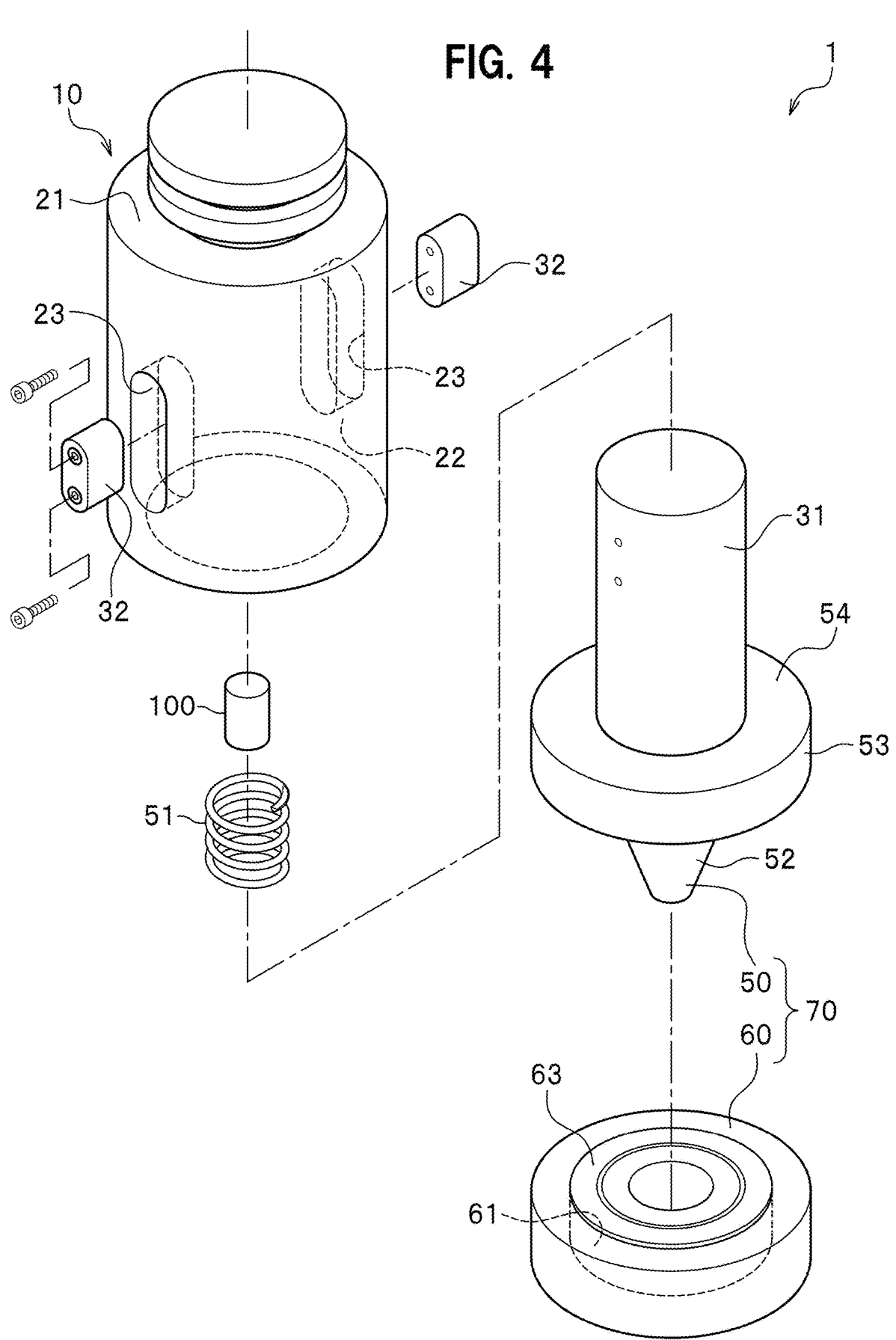
FIG. 4 is an exploded perspective view showing the rotating tool according to the first embodiment.

As also shown in FIGS. 2 and 3, the main body 10 further includes a holder 21 and a slide shaft 31.

<Holder>

The holder 21 is a portion that is attached to the rotating shaft 12, rotates in synchronization with the rotating shaft 12, and supports the slide shaft 31 and the stir pin 50. The holder 21 has a bottomed cylinder shape (hollow tube shape) whose upper portion is closed, and a hollow portion inside the holder 21 is a housing recess portion 22 in which the slide shaft 31 is inserted. The housing recess portion 22 has a cylindrical column shape, and is opened toward the lower side in the axial direction of the rotating shaft 12 (lower side in FIG. 1). Key grooves 23 are formed in a cylinder body portion of the holder 21. The key grooves 23 are formed in an obround shape elongating in the axial direction (up-down direction in FIG. 1) of the rotating shaft 12, and penetrate the holder 21 from an outer peripheral surface to an inner peripheral surface of the holder 21. The key grooves 23 do not have to penetrate the cylinder body portion, and may be formed in a groove shape on the inner peripheral surface of the cylinder body portion. The key grooves 23 are arranged at intervals of 180° in a circumferential direction of the cylinder body portion, and are formed at two locations to face each other. Note that the number of key grooves 23 is not limited to two, and may be one or three or more.

<Slide Shaft>

The slide shaft 31 is a portion that is housed in the housing recess portion 22 in a center portion of the holder 21 to be slidable in a rotating shaft direction (up-down direction in FIG. 1) and that rotates in synchronization (corotates) with the holder 21. The slide shaft 31 has a cylindrical column shape, and has such an outer diameter that the slide shaft 31 can be housed in the housing recess portion 22. An outer peripheral surface of the slide shaft 31 is provided with keys 32 protruding outward. The keys 32 are fixed at positions corresponding to the key grooves 23, in a base end portion of the slide shaft 31 (end portion on the rotating shaft 12 side: upper end portion in FIG. 1), and are inserted into the key grooves 23. The keys 32 have an obround shape elongating in the rotating shaft direction, have a width dimension equivalent to the key grooves 23, and have a shorter length dimension than the dimension of the key grooves 23 in a longitudinal direction. In other words, the keys 32 are fitted in the width direction of the key grooves 23, and can move in the longitudinal direction. Note that the shape of the keys 32 is not limited to the obround shape, and may be other shapes such as circle, ellipse, long ellipse, or rectangle shape as long as the keys 32 have a width dimension equivalent to the key grooves 23. The stir pin 50 is integrally provided in a distal end portion of the slide shaft 31 (end portion on the side away from the joining device 3: lower end portion in FIG. 1). Accordingly, the stir pin 50 is biased toward the distal end side of the slide shaft 31 (side away from the joining device 3: lower side in FIG. 1) by being biased toward the distal end side by the first elastic member 51.

<Stir Pin>

The stir pin 50 is a portion that is inserted into the to-be-joined members 2 while being rotated by receiving rotating force from the main body 10 to perform friction stirring on the to-be-joined members 2. The stir pin 50 is made of, for example, tool steel, and is formed in a cylindrical column shape. A distal end portion 52 (lower end portion in FIG. 1) of the stir pin 50 is tapered toward a distal end. The distal end of the distal end portion 52 of the stir pin has a flat surface shape orthogonal to the axial direction. A flange portion 53 with an enlarged diameter is formed integrally with a base end portion of the stir pin 50. The flange portion 53 is formed integrally with the slide shaft 31, and the stir pin 50 and the flange portion 53 move in the axial direction of the rotating shaft by slide movement of the slide shaft 31. The flange portion 53 has a larger diameter than the slide shaft 31, and a step portion 54 having a ring shape in a plan view is formed in a coupling portion of the flange portion 53 and the slide shaft 31 (base end portion of the flange portion 53). The flange portion 53 functions as a receiving portion that receives elastic force of the first elastic member 51 from the base end side (side close to the joining device 3: upper side in FIG. 1) of the slide shaft 31. The flange portion 53 also functions as a supporting portion that supports the shoulder 60 provided on the distal end side (lower side in FIG. 1) of the stir pin 50.

<Shoulder>

The shoulder 60 is a portion that presses the to-be-joined members 2 in a state where the shoulder 60 is in contact with the to-be-joined members 2. The shoulder 60 is formed as a body separate from the stir pin 50, provided to be rotatable relative to the stir pin 50, and receives no rotating force from the main body 10. The shoulder 60 is unable to move relative to the stir pin 50 in the axial direction of the rotating shaft 12, and moves in the axial direction together with the stir pin 50. In other words, the shoulder 60 is movable in the axial direction relative to the holder 21. Specifically, the shoulder 60 is made of, for example, tool steel. The shoulder 60 has a cylindrical shape, and is arranged coaxial to the stir pin 50 to surround the stir pin 50. Specifically, the stir pin 50 is inserted in a hollow portion 61 of the shoulder 60. A base end portion (upper end portion in FIG. 1) of the hollow portion 61 is opened, and a bearing 63 is interposed between the stir pin 50 and the shoulder 60. The bearing 63 is arranged to surround the stir pin 50. The shoulder 60 can thereby rotate relative to the stir pin 50 and cannot move relative to the stir pin 50 in the axial direction.

A distal end portion (distal end surface) of the shoulder 60 is at the same height as a base end portion of a tapered surface of the distal end portion 52 in the stir pin 50. Specifically, the distal end portion 52 of the stir pin 50 protrudes toward the distal end side, from the distal end surface of the shoulder 60. The shoulder 60 moves in the axial direction of the rotating shaft 12 together with the stir pin 50 integrally coupled to the slide shaft 31, by the slide movement of the slide shaft 31.

As described above, the stir pin 50 and the shoulder 60 are integrated to form together the assembly 70 that moves in the axial direction of the rotating shaft 12. In other words, the assembly 70 is provided at a distal end of the slide shaft 31.

<First Elastic Member>

The first elastic member 51 is a portion that biases the assembly 70 including the stir pin 50 and the shoulder 60 toward the distal end side in the axial direction of the rotating shaft. The first elastic member 51 is formed of, for example, a coil spring, is housed inside the holder 21, and is fitted between a base end portion 31b of the slide shaft 31 and a bottom portion 22a of the housing recess portion 22 in the holder 21. The first elastic member 51 can bias the assembly 70 toward the distal end side against force received from the assembly 70 side.

The elasticity of the first elastic member 51 is set such that, when the stir pin 50 is inserted into the to-be-joined members 2 made of at least one material selected from the group consisting of aluminum, copper, magnesium, and alloys of these metals at predetermined plunging load, the stir pin 50 is inserted while changing its position within a predetermined range in an entire movable range of the stir pin 50 achieved by the first elastic member 51.

For example, the elasticity is set such that, when the first elastic member 51 is a coil spring and the stir pin 50 is inserted with the load applied to the first elastic member 51 being 100 kg to 5 t, the stir pin 50 is inserted into the to-be-joined members 2 with deformation being such that a deflection amount of the first elastic member 51 is within a range of 0 to 30% of the free length of the first elastic member 51, and the shoulder 60 presses the to-be-joined members 2. Accordingly, even if the height of the to-be-joined members 2 changes when the stir pin 50 is plunged at a constant height relative to the to-be-joined members 2, the first elastic member 51 deforms in accordance with the change in the to-be-joined members, and this facilitates maintaining of an insertion amount of the stir pin 50 at a constant amount.

Note that the first elastic member 51 is not limited to a coil spring, and may be a metal spring such as a leaf spring or a disc spring or a polymer elastic body (elastomer) of rubber, a polymer resin, a sponge-like resin, or the like. Moreover, the first elastic member 51 may be a fluid spring using air pressure, gas pressure, or hydraulic pressure or a magnetic spring using magnetic force or electromagnetic force.

The first elastic member 51 only needs to be set to satisfy a relationship between a deformation amount and elasticity in which the stir pin 50 is inserted to a predetermined depth, in consideration of joining conditions. Moreover, the first elastic member 51 only needs to be set to satisfy a relationship between the deformation amount and the elasticity in which the shoulder 60 can press the to-be-joined members 2 without being inserted into the to-be-joined members 2 in the state where the shoulder 60 pressed against the to-be-joined members 2 is in contact with the to-be-joined members 2, in consideration of the joining conditions. The joining conditions that affect the setting of the first elastic member 51 include, for example, conditions of the to-be-joined members such as the material of the to-be-joined members 2 and the shape of a joining portion and joining modes such as an insertion depth of the stir pin 50 and the shape, rotating speed, and moving speed of the rotating tool 1.

Note that the shoulder 60 only needs to be in contact with the to-be-joined members 2 at least partially, and a gap may be formed between the shoulder 60 and the to-be-joined members 2 to some extent depending on a relationship with a surface shape of the to-be-joined members 2. However, the shoulder 60 preferably comes into contact with the to-be-joined members 2 without a gap to press a metal material overflowing due to the friction stir welding and prevent formation of a weld flash. Moreover, the shoulder 60 may be inserted into the to-be-joined members 2 to some extent. However, the shoulder 60 is preferably inserted at such a level that no recess portion is formed after the joining due to the contact between the to-be-joined members 2 and the shoulder 60, and is preferably not deeply inserted.

<First Restriction Member>

The first restriction member (first loosely-fitted restriction member) 100 is a member that restricts movement of the stir pin 50 toward the base end side of the rotating shaft 12 beyond a predetermined range as shown in FIG. 1 and the like. In the present embodiment, the first restriction member 100 is arranged in a hollow portion of the first elastic member 51 in a loosely-fitted state, inside the holder 21. The first restriction member 100 is made of a material that is a metal, a resin, rubber, or the like and that is relatively hard to withstand reaction force in friction stir welding. Although the first restriction member 100 has a cylindrical column shape in the present embodiment, the first restriction member 100 may be formed as appropriate according to the shape of an arrangement location. The first restriction member 100 restricts the movement of the stir pin 50 such that an amount of deformation occurring in the first elastic member 51 with the movement of the stir pin 50 does not exceed the maximum deflection amount (maximum allowable amount) of the first elastic member 51.

For example, the maximum deflection amount of the first elastic member 51 according to the present embodiment is set to a deflection amount in the case where the first elastic member 51 is deformed by 30% of the free length of the first elastic member 51. The maximum deflection amount means an amount at which the first elastic member 51 is most compressed when elastic force of the first elastic member 51 is exerted. When the deflection amount exceeds the maximum deflection amount, the elastic force of the first elastic member 51 is not exerted according to the performance, or the first elastic member 51 breaks earlier than expected.

As shown in FIG. 2, in the present embodiment, when the deflection amount of the first elastic member 51 reaches 30% of the free length of the first elastic member 51, in the first restriction member 100, a distal end portion (distal end surface) 100a of the first restriction member 100 comes into the contact with the base end portion 31b of the slide shaft 31, and a base end portion (base end surface) 100b comes into contact with the bottom portion 22a. This can prevent the first elastic member 51 from exceeding the maximum deflection amount and deforming. The maximum deflection amount of the first elastic member 51 can be set as appropriate depending on the first elastic member 51 and the first restriction member 100. The maximum deflection amount of the first elastic member 51 may be, for example, 25%, 20%, 15%, 10%, or 5%.

Note that, since the first elastic member 51 is used in the present embodiment, "maximum deflection amount" is used. Meanwhile, for example, when a different member (fluid spring using air pressure, gas pressure, or hydraulic pressure or magnetic spring using magnetic force or electromagnetic force) is used as the first elastic member as described above, an amount at which the elastic force is not exerted or the elastic member breaks if this amount is exceeded is defined as "maximum allowable amount".

Moreover, in the present embodiment, the first restriction member 100 is a solid body of a metal or the like, and restricts the movement of the stir pin 50 by being brought into contact with the stir pin 50. However, the movement of the stir pin 50 may be restricted in a contactless manner by using, for example, a fluid spring using air pressure, gas pressure, or hydraulic pressure or a magnetic spring using magnetic force or electromagnetic force.

Furthermore, the shape and arrangement of the first restriction member 100 are not limited as long as the first restriction member 100 restricts the movement of the assembly 70. For example, the first restriction member 100 may be such that part of the main body 10 or the stir pin 50 functions as the first restriction member 100 or the first restriction member 100 is provided by being formed integrally with the main body 10 or the stir pin 50. Alternatively, the first restriction member 100 may be provided in a form in which a separate member is attached to the main body 10 or the stir pin 50.

<Holding Unit>

As shown in FIG. 3, the holding unit 80 is a rod-shaped arm-like member, and a distal end portion of the holding unit 80 is fixed to an outer peripheral surface of the shoulder 60. A base end portion of the holding unit 80 is connected to a fixed system on the joining device 3 side, and holds the shoulder 60 in a not-rotating state. The holding unit 80 is included in the rotating tool 1. The shoulder 60 is provided to be rotatable relative to the rotating shaft 12, the holder 21, and the stir pin 50, and is held in the not-rotating state by the holding unit 80. The shoulder 60 can be thereby held in the not-rotating state also when the stir pin 50 rotates.

[1-2. Joining Device]

Next, a configuration of the joining device 3 including the rotating tool 1 with the above-mentioned configuration is explained. The joining device 3 includes a power unit (not shown) that outputs the rotating force to be transmitted to the rotating shaft 12 of the rotating tool 1 and a position controller (not shown) that holds the fixation portion 11 of the rotating tool 1 and performs position control of the rotating tool. The joining device 3 is formed of, for example, a machining center that performs position control. A position control device is formed of a CPU and the like, and activates the power unit and causes the power unit to move the rotating tool 1 based on position information inputted in advance. The power unit moves the rotating tool 1 in directions of three axes of X, Y, and Z.

[1-3. Joining Method]

Next, a joining method according to the present invention is explained with reference to FIG. 5. In this joining method, the friction stir welding on the to-be-joined members 2 is performed by moving the rotating tool 1 of the present embodiment such that the rotating tool 1 is located at a predetermined height position set in advance relative to the to-be-joined members 2, and inserting the stir pin 50 of the rotating tool 1 into the to-be-joined members 2 with the shoulder 60 of the rotating tool 1 pressed against the to-be-joined members 2.

In the insertion of the stir pin 50, the distal end of the stir pin 50 first comes into contact with the to-be-joined members 2 as the rotating tool 1 is brought closer to the to-be-joined members 2 in an insertion direction. When the rotating tool 1 is brought even closer to the to-be-joined members 2, the stir pin 50 is inserted into the to-be-joined members while the elastic force by the first elastic member 51 biasing the stir pin 50 toward the to-be-joined members 2 increases due to compression of the first elastic member 51.

When the rotating tool 1 is brought even closer to the to-be-joined members 2, the shoulder 60 comes into contact with the to-be-joined members 2. The shoulder 60 is pressed against the to-be-joined members 2 while the elastic force by the first elastic member 51 biasing the stir pin 50 and the shoulder 60 toward the to-be-joined members 2 further increases due to compression of the first elastic member 51. In this case, the first elastic member 51 and the joining conditions are set such that the stir pin 50 can be inserted into the to-be-joined members 2 and the shoulder 60 can press the to-be-joined members 2 in a state where a room for deformation of the first elastic member 51 is left to prevent the deflection amount of the first elastic member 51 from exceeding the maximum deflection amount. Alternatively, the stir pin 50 is inserted into the to-be-joined members 2 by being pressed against the to-be-joined members 2 in a state where the movement of the assembly 70 is restricted by the first restriction member 100 to prevent the deflection amount of the first elastic member 51 from exceeding the maximum deflection amount. Moreover, the first elastic member 51 and the joining conditions are set such that the shoulder 60 can press the to-be-joined members 2 without being inserted into the to-be-joined members 2 in a state where the shoulder 60 is in contact with the to-be-joined members 2.

Figure 5:
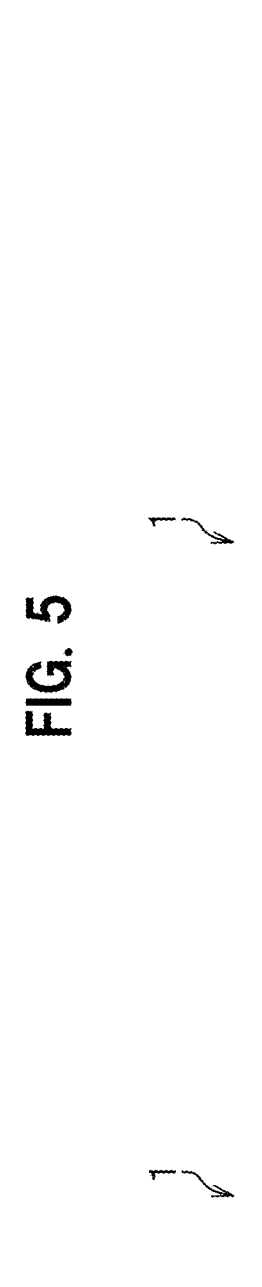
FIG. 5 is a cross-sectional view showing an operation of each part in friction stir welding of the rotating tool according to the first embodiment.

In the joining by the rotating tool 1, as shown in a left portion of FIG. 5, the assembly 70 including the stir pin 50 and the shoulder 60 is biased toward the distal end side by the first elastic member 51. As shown in the left portion of FIG. 5, the distal end portion 52 of the stir pin 50 is thereby plunged into the to-be-joined members 2 to the desired depth when there is no error in the height of the to-be-joined members 2 with respect to a set value. Moreover, the shoulder 60 can press the to-be-joined members 2 without being inserted into the to-be-joined members 2 in the state where the shoulder 60 is in contact with the to-be-joined members 2.

Next, explanation is given of the case where the height of the to-be-joined members 2 becomes slightly higher than the set value due to an error while the friction stir welding is performed as shown in a center portion of FIG. 5. In this case, if the first elastic member 51 is absent and the stir pin 50 is directly plunged into the to-be-joined members 2, the insertion amounts of the stir pin 50 and the shoulder 60 increase from those in the case where there is no error in the height of the to-be-joined members 2 with respect to the set value, by an amount corresponding to the increase in the height of the to-be-joined members 2.

Meanwhile, when the joining is performed with the rotating tool 1 of the present embodiment, the increase in the height of the to-be-joined members 2 causes the assembly 70 including the stir pin 50 to receive upward reaction force from the to-be-joined members 2 and be pushed upward. Moreover, this upward pushing compresses the first elastic member 51, and the assembly 70 is pushed downward by receiving downward elastic force from the first elastic member 51. The positions of the stir pin 50 and the shoulder 60 are changed to positions where the upward reaction force and the downward elastic force generated with the change in the height of the to-be-joined members 2 as descried above balance out. The first elastic member 51 is set such that the insertion amounts of the stir pin 50 and the shoulder 60 in this case are about the same as the insertion amounts in the case where there is no error in the height of the to-be-joined members 2 with respect to the set value. If the elastic force of the first elastic member 51 is too small, the upward reaction force generated with the change in the height of the to-be-joined members 2 becomes larger than the downward elastic force, and the insertion amounts decrease. Meanwhile, if the elastic force of the first elastic member 51 is too large, the downward elastic force generated with the change in the height of the to-be-joined members 2 becomes larger than the upward reaction force, and the insertion amounts increase. Specifically, the first elastic member 51 is set such that, in the rotating tool 1, the stir pin 50 is inserted into the to-be-joined members 2 to the desired depth set according to the height of the set value of the to-be-joined members 2 even when the height of the to-be-joined members 2 fluctuates and increases. Moreover, the first elastic member 51 is set such that, in the rotating tool 1, the shoulder 60 presses the to-be-joined members 2 without being inserted into the to-be-joined members 2 in the state where the shoulder 60 is in contact with the to-be-joined members 2 even when the height of the to-be-joined members 2 fluctuates and increases.

Moreover, when the height of the to-be-joined members 2 becomes smaller than the set value, as shown in a right portion of FIG. 5, the first elastic member 51 expands and the assembly 70 including the stir pin 50 descends. The first elastic member 51 is set such that, in the rotating tool 1, the stir pin 50 is inserted into the to-be-joined members 2 to the desired depth set according to the height of the set value of the to-be-joined members 2 even when the height of the to-be-joined members 2 fluctuates and decreases as described above. Moreover, the first elastic member 51 is set such that, in the rotating tool 1, the shoulder 60 presses the to-be-joined members 2 without being inserted into the to-be-joined members 2 in the state where the shoulder 60 is in contact with the to-be-joined members 2 even when the height of the to-be-joined members 2 fluctuates and decreases.

In the rotating tool 1, since the stir pin 50 is inserted into the to-be-joined members 2 to a constant depth by the action of the first elastic member 51 as described above, a plasticized region is formed to have a constant depth. Accordingly, stable joining quality can be obtained. Moreover, in the rotating tool 1, the friction stirring is performed by inserting the stir pin 50 into the to-be-joined members 2 while maintaining the state where the shoulder 60 is pressed against the to-be-joined members 2 by the action of the first elastic member 51. The shoulder 60 can thereby press the metal material overflowing from the insertion portion of the stir pin 50 by being subjected to the friction stirring by the stir pin 50. Accordingly, generation of a weld flash can be reduced.

[1-4. Operations and Effects]

In the rotating tool 1, the joining device 3, and the joining method according to the present embodiment, the assembly 70 provided to be movable in the axial direction of the rotating shaft 12 is biased toward the distal end side by the first elastic member 51, and the stir pin 50 is thereby inserted to a predetermined depth depending on the elasticity of the first elastic member 51 when the distal end portion 52 of the stir pin 50 is inserted into the to-be-joined members 2. Moreover, causing the first elastic member 51 to bias the assembly 70 toward the distal end side causes the shoulder 60 to be pressed against the to-be-joined members 2 depending on the elasticity of the first elastic member 51. Setting the first elastic member 51 in consideration of the joining conditions such as the to-be-joined members and the joining mode allows the stir pin 50 to be inserted to the desired depth and allows the shoulder 60 to press the to-be-joined members 2. In other words, the rotating tool 1 can perform quasi-load control using the first elastic member 51.

When a rotating tool with no elastic member is attached to a joining device such as, for example, a machining center that can perform only the position control, the supporting height of the rotating tool 1 is constant based on a value set by the machining center, and the insertion position of the stir pin 50 is substantially constant. Meanwhile, when the rotating tool 1 of the present embodiment is used, the first elastic member 51 expands and contracts as appropriate depending on fluctuation in the height of the to-be-joined members 2, and the assembly 70 is moved in the axial direction even when the supporting height of the rotating tool 1 by the machining center is constant. Using the elasticity of the first elastic member 51 as described above enables load control in which the insertion depth of the stir pin 50 into the to-be-joined members 2 and the contact mode of the shoulder 60 with the to-be-joined members 2 can be controlled.

Moreover, the rotating tool 1 includes the shoulder 60 that is arranged to receive no rotating force from the rotating shaft 12 and to be movable in the axial direction of the rotating shaft 12 independently of the stir pin 50 and that presses the to-be-joined members 2. The shoulder 60 presses the metal material overflowing from the insertion portion of the stir pin 50 by being subjected to the friction stirring by the stir pin 50, and can thereby reduce the generation of a weld flash. The shoulder 60 can thereby improve the finish of the surface after the friction stir welding.

Regarding the load control, when the friction stirring is performed by using, for example, a compressed coil spring as the elastic member, there is a problem in which the stir pin can be inserted into a relatively-soft aluminum alloy such as 1000 series, but cannot be inserted into a hard aluminum alloy.

This is because compression of the compressed coil spring exceeding the maximum allowable amount (maximum deflection amount) needs to be avoided. In other words, it is difficult to apply load to the rotating tool at such a level that the deflection amount of the compressed coil spring exceeds the maximum deflection amount thereof. Specifically, it is difficult to insert the stir pin into hard to-be-joined members for which the compressed coil spring needs to compressed beyond its limit, while performing simple load control. If the deflection amount of the compressed coil spring exceeds the maximum deflection amount thereof, the spring may break at an early stage.

Incidentally, when the joining device 3 proceeds with the insertion while bringing the stir pin 50 into contact with the to-be-joined members 2 and increasing the load applied to the rotating tool 1 as at, for example, the start position of the friction stir welding, the reaction force that is generated (generated reaction force) and heat generated by friction heat increases as time elapses and the insertion amount increases. Normally, in the friction stir welding, softening of the material caused by the heat generation of the stir pin 50 does not catch up with the insertion of the stir pin 50, and the generated reaction force is highest at the point where the stir pin 50 is plunged to a predetermined depth. When the stir pin 50 is inserted into the to-be-joined members 2 to the predetermined depth and the plunging of the rotating tool 1 stops, the softening of the material caused by the heat generation of the stir pin 50 catches up with the insertion amount of the rotating tool 1, and this can reduce the load applied to the rotating tool 1, and reduce the generated reaction force. Such a state is referred to as "steady state".

Figure 6:
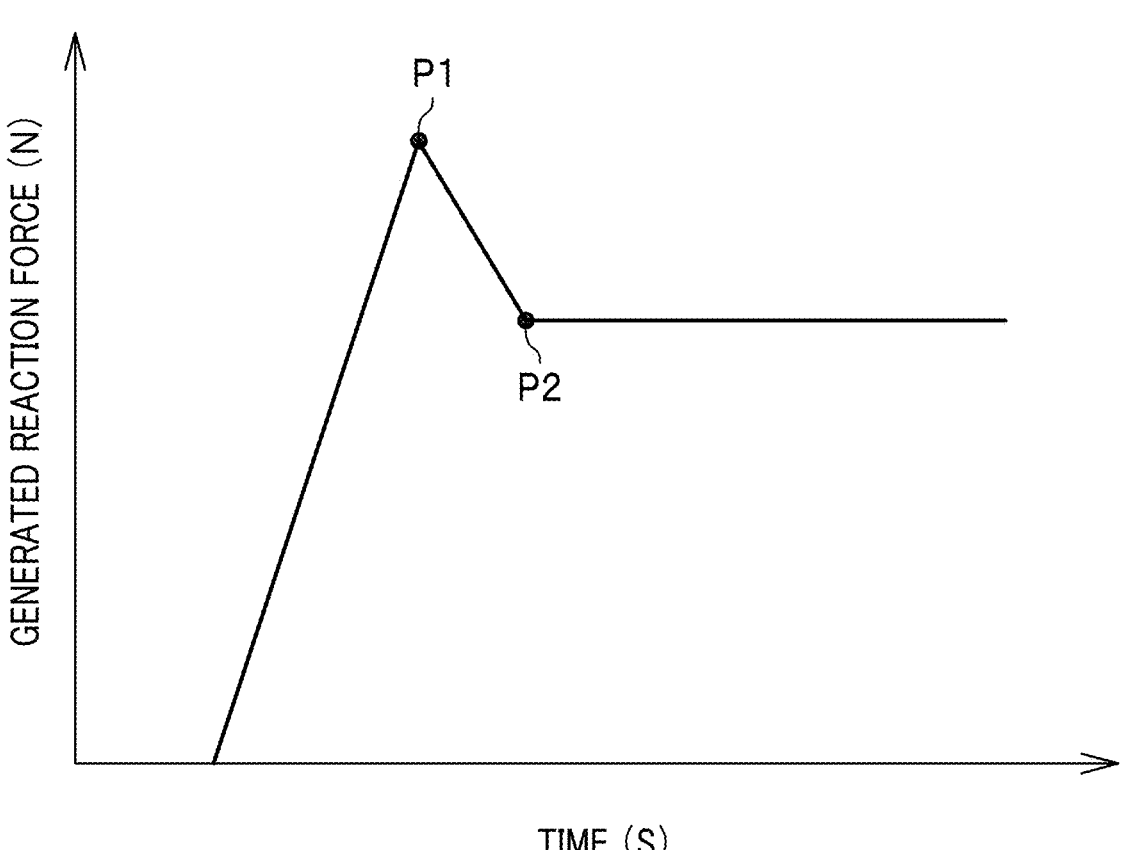
FIG. 6 is a graph showing time and generated reaction force in the friction stir welding of the rotating tool according to the first embodiment.

FIG. 6 is a graph showing time and the generated reaction force in the friction stir welding of the rotating tool according to the first embodiment. The point P1 shows a point where the stir pin 50 is plunged into the to-be-joined members 2 at the greatest degree at the start position of the friction stir welding. The point P2 shows a starting point of the steady state of the friction stir welding. The graph is a straight line rising toward the right side up to the point P1, and the straight line indicates a state where the stir pin 50 is plunged into the to-be-joined members 2. In the friction stir welding, the generated reaction force gradually increases and reaches its peak (point P1) in the plunging of the stir pin 50, slightly decreases according to proceeding of the stir pin 50, and then becomes substantially constant in the steady state (point P2).

The rotating tool 1 according to the present embodiment includes the first restriction member 100 that restricts the movement of the stir pin 50 toward the base end side in the axial direction. The first restriction member 100 thereby restricts the movement of the stir pin 50 within a range in which the amount of deflection occurring in the first elastic member 51 does not exceed the maximum deflection amount of the first elastic member 51, in the insertion of the rotating tool 1 at which the generated reaction force (load) is the largest and at positions where the shape of the to-be-joined members 2 greatly changes. Accordingly, it is possible to avoid the case where the first elastic member 51 exceeds its limit and deforms even when the to-be-joined members 2 is relatively hard and large load is required. This allows the stir pin 50 to be inserted also into relatively-hard to-be-joined members 2 while using the first elastic member 51, and can also prevent breakage of the first elastic member 51 and the rotating tool 1.

Moreover, the stir pin 50 is pressed against the to-be-joined members 2 in the state where the stir pin 50 restricted by the first restriction member 100 is supported by the first restriction member 100 (state where the first restriction member 100 is in contact with the slide shaft 31 and the bottom portion 22a and is sandwiched therebetween), and the load applied by the joining device is applied to the stir pin 50 via the first restriction member 100. This allows the stir pin 50 to be inserted into the to-be-joined members 2.

Then, in the steady state, the generated reaction force (load) is reduced, the support of the stir pin 50 by the first restriction member 100 is cancelled, and the stir pin 50 not restricted by the first restriction member 100 is allowed to move in the axial direction of the rotating shaft 12.

Moreover, the first elastic member 51 preferably has an outer diameter and a free length as small (short) as possible to prevent an increase in the size of the rotating tool 1. The smaller the free length of the first elastic member 51 is, the larger the spring constant is, provided that the outer diameter is constant. Accordingly, insertion is facilitated also into the relatively-hard to-be-joined members 2. However, an increase of the spring constant tends to increase the generated reaction force (load) with respect to a change amount, and the robustness thus decreases. Specifically, if the spring constant is increased, the stir pin 50 is more likely to be affected by the first elastic member 51. Accordingly, there is a problem in which an operation of the stir pin 50 becomes unstable (less controllable) in the steady state.

In this respect, according the present embodiment, since the first restriction member 100 restricts the movement of the slide shaft 31, force can be transmitted to the stir pin 50 via the first restriction member 100 without an increase of the spring constant of the first elastic member 51. This allows the stir pin 50 to be inserted also into the relatively-hard to-be-joined members 2. Moreover, since the spring constant of the first elastic member 51 does not have to be increased by an amount corresponding to provision of the first restriction member 100, the degree of freedom in design of the first elastic member 51 increases, and it is possible to improve the robustness in the steady state and stably control the stir pin 50.

The main body 10 further includes the cylindrical holder 21 and the slide shaft 31 that is housed in the center portion of the holder 21 to be slidable in the rotating shaft direction and that rotates in synchronization with the holder 21, and the assembly 70 is provided at the distal end of the slide shaft 31. This allows the assembly 70 to slide in the rotating shaft direction while allowing the rotating force from the main body 10 to be transmitted to the assembly 70.

In the rotating tool 1, the first elastic member 51 is housed inside the holder 21, and is arranged between the base end portion 31b of the slide shaft 31 and the bottom portion 22a of the holder 21. The first elastic member 51 can thereby receive the force received from the stir pin 50 side at the bottom portion 22a of the holder 21. Accordingly, even if the slide shaft 31 moves, the first elastic member 51 stably biases the stir pin 50 toward the distal end side, and the accuracy of the load control of the stir pin 50 can be thereby improved.

Moreover, the key grooves 23 are formed in the holder 21, and the keys 32 are formed in the slide shaft 31. The slide shaft 31 and the assembly 70 are thereby allowed to move in the axial direction in a stable state while rotating in synchronization with the rotation of the holder 21. Accordingly, the operations of the stir pin 50 and the shoulder 60 are further stabilized.

The bearing 63 is interposed between the shoulder 60 and the stir pin 50. Accordingly, the shoulder 60 and the stir pin 50 can rotate relative to each other in a stable state.

Moreover, since the rotating tool 1 includes the holding unit 80 that holds the shoulder 60 in the not-rotating state, the shoulder 60 can be easily held in the not-rotating state, and the finish of the surface of the to-be-joined members 2 after the friction stir welding is further improved.

In the rotating tool 1, the first elastic member 51 is an elastic member that applies elastic force by using at least one selected from a solid spring, a fluid spring, magnetic force, and electromagnetic force. According to such a configuration, the elasticity of the first elastic member 51 can be easily adjusted.

The joining device 3 includes the rotating tool 1, the power unit, and the position controller. The joining device 3 performs the friction stir welding on the to-be-joined members 2 by causing the position controller to move the rotating tool 1 such that the rotating tool 1 is located at the predetermined height position relative to the to-be-joined members 2, and insert the stir pin 50 into the to-be-joined members 2 with the shoulder 60 pressed against the to-be-joined members 2. According to the joining device 3, it is possible to perform the friction stir welding while performing the load control in which the insertion depth of the stir pin 50 into the to-be-joined members 2 and the contact of the shoulder 60 with the to-be-joined members 2 are controlled by using the elasticity of the first elastic member 51. Moreover, causing the shoulder 60 to press the metal material overflowing from the insertion portion of the stir pin 50 by being subjected to the friction stirring by the stir pin 50 can reduce generation of a weld flash and improve the finish of the surface after the friction stir welding. Accordingly, it is possible to perform quasi-load control by using also the machining center, and the finish of the surface after the friction stir welding is improved.

In the present joining method, the friction stir welding on the to-be-joined members 2 is performed by moving the rotating tool 1 such that the rotating tool 1 is located at the predetermined height position relative to the to-be-joined members 2, and inserting the rotating stir pin 50 into the to-be-joined members 2 with the shoulder 60 pressed against the to-be-joined members 2. According to the present joining method, it is possible to perform the friction stir welding while performing the load control in which the insertion depth of the stir pin 50 into the to-be-joined members 2 and the contact of the shoulder 60 with the to-be-joined members 2 are controlled by using the elasticity of the first elastic member 51. Moreover, causing the shoulder 60 to press the metal material overflowing from the insertion portion of the stir pin 50 by being subjected to the friction stirring by the stir pin 50 can reduce generation of a weld flash and improve the finish of the surface after the friction stir welding.

As described above, according to the rotating tool 1, the joining device 3, and the joining method, even in the state where the rotating tool is attached to a machining center that performs only the position control, it is possible to perform the friction stir welding while performing the load control by using the first elastic member 51. Moreover, according to the rotating tool 1, the joining device 3, and the joining method, it is possible to insert the stir pin into relatively-hard to-be-joined members while preventing the breakage of the first elastic member 51 and perform the friction stir welding while performing the load control by using the first restriction member 100.

2. First Modified Example

Figure 7:
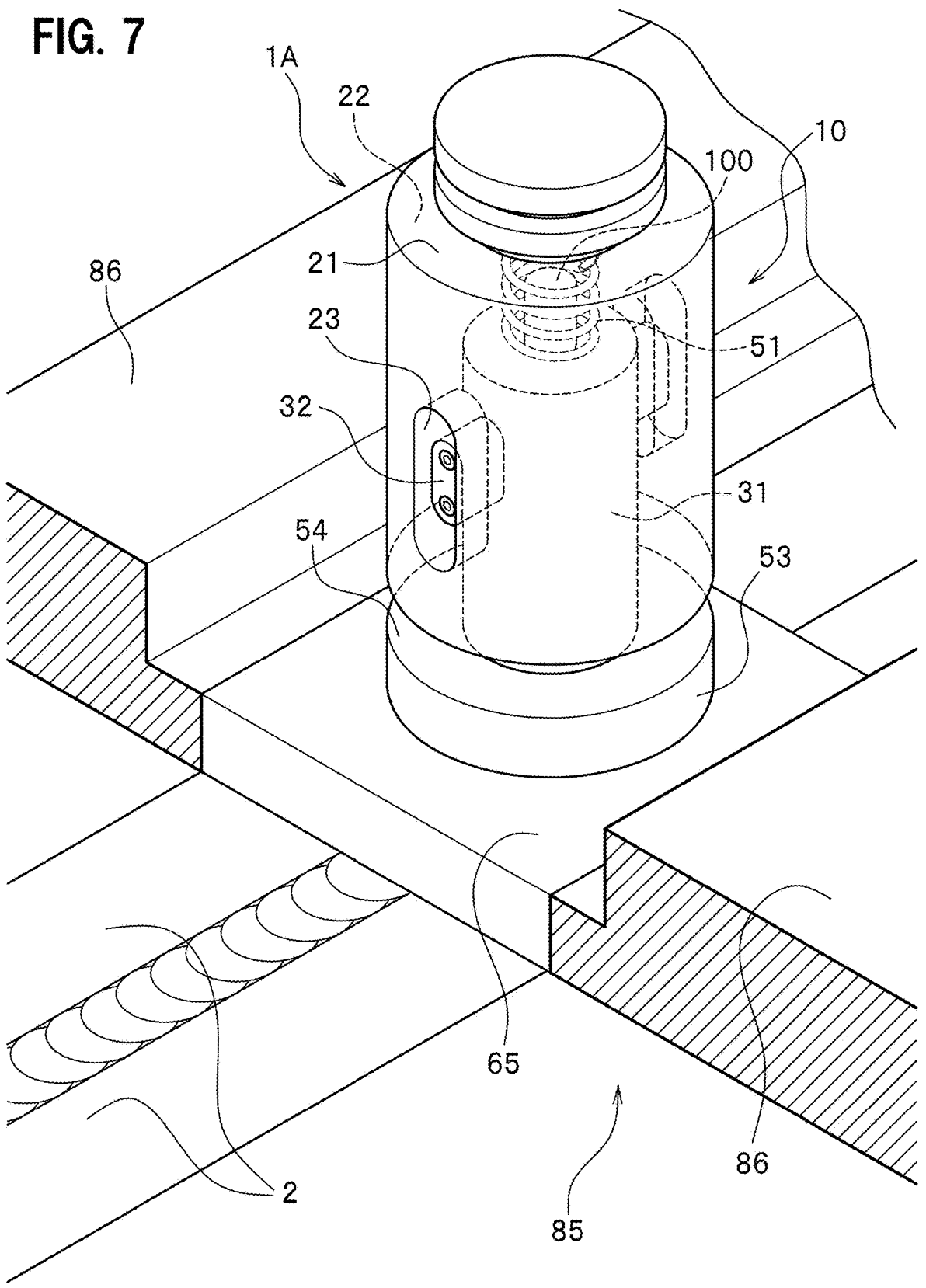
FIG. 7 is a perspective view showing a rotating tool according to a first modified example of the first embodiment of the present invention.

Next, a first modified example of the first embodiment is explained with reference to FIG. 7. In a holding unit 85 according to the first modified example, as shown in FIG. 7, an outer shape of a shoulder 65 provided below the flange portion 53 has a rectangular shape, and guide members 86 are provided along a movement trajectory of a rotating tool 1A.

The guide members 86 are formed of elongating members, and are arranged to sandwich the shoulder 65 from both sides. The guide members 86 are holding units included in the joining device 3. The shoulder 65 with such a configuration moves along the movement trajectory without rotating while outer peripheral surfaces of the shoulder 65 slide on side surfaces of the guide members 86. Like the shoulder 60 of FIG. 1, the stir pin 50 and the bearing 63 are inserted inside the shoulder 65. Since other configurations are similar to those in the rotating tool 1 of FIG. 1, the other configurations are denoted by the same reference numerals, and explanation thereof is omitted.

3. Second Modified Example

Figure 8:
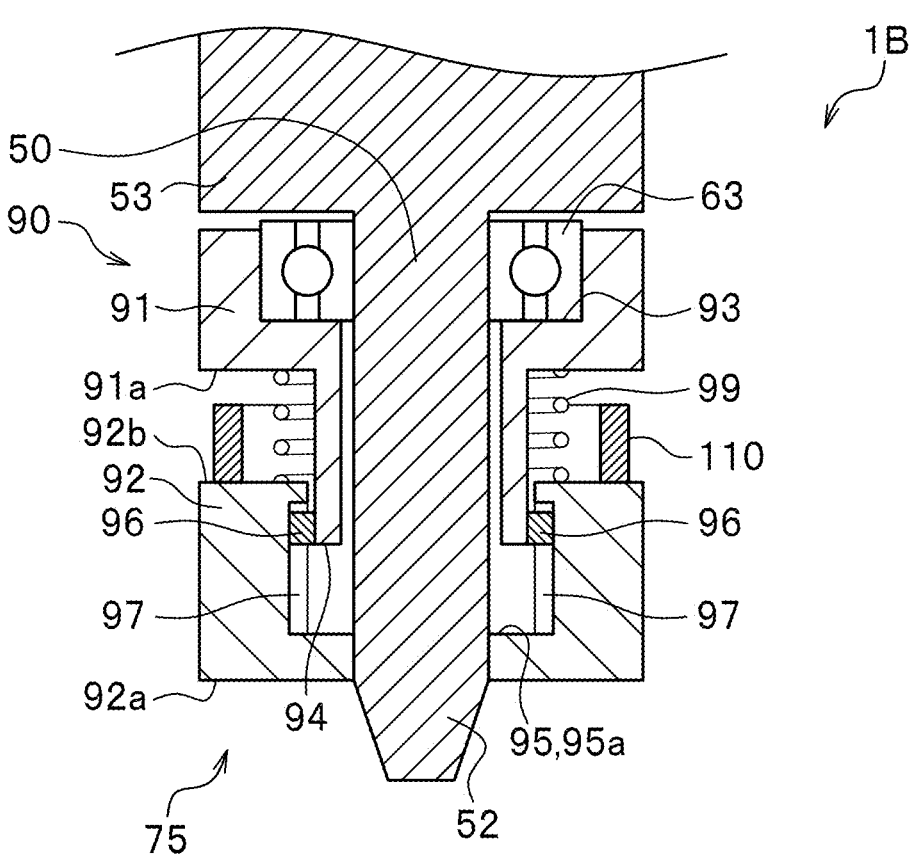
FIG. 8 is a cross-sectional view showing a rotating tool according to a second modified example of the first embodiment of the present invention.

Next, a second modified example of the first embodiment is explained with reference to FIG. 8. In the above embodiment, a lower end surface of the shoulder 60 cannot move in the axial direction of the rotating shaft relative to the stir pin 50. However, as shown in FIG. 8, a shoulder 90 according to the second modified example is configured such that a lower end surface of the shoulder 90 is movable in the axial direction. Specifically, the shoulder 90 of a rotating tool 1B includes a first member 91, a second member 92, a second elastic member 99, and a second restriction member 110. Moreover, the stir pin 50 and the shoulder 90 are integrated to form together an assembly 75 that moves in the axial direction of the rotating shaft 12.

The first member 91 is a portion provided to be rotatable relative to the stir pin 50, and is made of, for example, tool steel. The first member 91 has a cylindrical shape, and is arranged coaxial to the stir pin 50 to surround the stir pin 50. The stir pin 50 is inserted in a hollow portion 93 of the first member 91. A base end portion (upper end portion in FIG.

8) of the hollow portion 93 is opened, and the bearing 63 is interposed between the stir pin 50 and the first member 91. The bearing 63 is arranged to surround the stir pin 50. The first member 91 can thereby rotate relative to the stir pin 50, and cannot move relative to the stir pin 50 in the axial direction.

A protruding portion 94 that protrudes from an intermediate end surface 91a of the first member 91 toward the distal end side is formed in a distal end portion (lower end portion in FIG. 8) of the first member 91. The protruding portion 94 has a cylindrical shape, and the stir pin 50 is inserted inside the protruding portion 94. The protruding portion 94 is a member for connection of the second member 92. Keys 96 protruding outward from an outer peripheral surface of the protruding portion 94 are provided in a distal end portion of the protruding portion 94. The keys 96 are inserted into key grooves 97 of the second member 92 to be described later. The keys 96 have an obround shape elongating in the rotating shaft direction, are arranged radially at intervals of 180° in the circumferential direction, and are formed at two locations. Note that the shape of the keys 96 is not limited to the obround shape, and may be other shapes such as circle, ellipse, long ellipse, or rectangle shape as long as the keys 96 have a width dimension equivalent to the key grooves 97.

The second member 92 is a portion that presses the to-be-joined members 2 in a state where the second member 92 is in contact with the to-be-joined members 2. The second member 92 is a portion that is attached to the protruding portion 94 and that can move in the axial direction of the rotating shaft 12 relative to the first member 91 while rotating in synchronization with the first member 91. The second member 92 is made of, for example, tool steel. The second member 92 has a cylindrical shape, and is arranged coaxial to the stir pin 50 to surround the stir pin 50. The stir pin 50 is inserted in a hollow portion 95 of the second member 92. A base end portion (upper end portion in FIG. 8) of the hollow portion 95 is opened, and the distal end portion of the protruding portion 94 is inserted.

The key grooves 97 are formed in the hollow portion 95. The key grooves 97 are formed in an obround shape elongating in the axial direction (up-down direction in FIG. 8) of the rotating shaft 12, and are formed in a groove shape on an inner peripheral surface of the hollow portion 95. The key grooves 97 are formed at two locations corresponding to the keys 96 of the protruding portion 94. The length of the key grooves 97 in the axial direction is longer than the length of the keys 96 in the axial direction, and the second member 92 can move in the axial direction relative to the first member 91. The width dimension of the key grooves 97 is equivalent to the width dimension of the keys 96, and the second member 92 cannot rotate relative to the first member 91. When the keys 96 are located on the base end side of the key grooves 97, a distal end portion (distal end surface) of the second member 92 is at the same height as a base end portion of the tapered surface of the distal end portion 52 in the stir pin 50. Specifically, the distal end portion 52 of the stir pin 50 protrudes from the distal end surface of the second member 92 toward the distal end side. When the second member 92 is moved from the above-mentioned position toward the first member 91 side, the length of the shoulder 90 in the axial direction decreases.

The second elastic member 99 is a portion that biases the second member 92 being part of the shoulder 90 toward the distal end side of the stir pin 50 in the axial direction of the rotating shaft 12. The second elastic member 99 is configured of, for example, a coil spring, and is arranged to surround the outer peripheral surface of the protruding portion 94. The second elastic member 99 is fitted between the intermediate end surface 91*a* of the first member 91 and a base end portion (base end surface) 92*b* of the second member 92. The second elastic member 99 can bias the second member 92 toward the distal end side against the force received from the second member 92.

The elasticity of the second elastic member 99 is set such that, when the stir pin 50 is inserted into the to-be-joined members 2 made of at least one material selected from the group consisting of aluminum, copper, magnesium, and alloys of these metals at predetermined plunging load, the second member 92 presses the to-be-joined members 2 while changing its position within a predetermined range in an entire movable range of the second member 92 achieved by the elastic member.

For example, the elasticity is set such that, when the second elastic member 99 is a coil spring and the stir pin 50 is inserted with the load applied to the second elastic member 99 being 50 kg to 2 t, the second member 92 presses the to-be-joined members 2 with deformation being such that a deflection amount of the second elastic member 99 is within a range of 0 to 30% of the free length of the second elastic member 99. This facilitates the pressing of the to-be-joined members 2 with the second member 92 while avoiding insertion of the second member 92 into the to-be-joined members 2 in the state where the second member 92 is in contact with the to-be-joined members 2. The second elastic member 99 is more deformable than the first elastic member 51.

Note that, like the first elastic member 51, the second elastic member 99 is not limited to a coil spring, and may be a metal spring such as a leaf spring or a disc spring or a polymer elastic body (elastomer) of rubber, a polymer resin, a sponge-like resin, or the like. Moreover, the second elastic member 99 may be a fluid spring using air pressure, gas pressure, or hydraulic pressure or a magnetic spring using magnetic force or electromagnetic force.

The second elastic member 99 only need to be set to satisfy a relationship between a deformation amount and elasticity in which the shoulder 90 can press the to-be-joined members 2 without being inserted into the to-be-joined members 2 in the state where the shoulder 90 pressed against the to-be-joined members 2 is in contact with the to-be-joined members 2, in consideration of the joining conditions. The joining conditions that affect the setting of the second elastic member 99 include, for example, a condition of the to-be-joined members such as the material of the to-be-joined members 2 and the shape of a joining portion and joining modes such as the insertion depth of the stir pin 50 and the shape, rotating speed, and moving speed of the rotating tool 1B. Note that the shoulder 90 only needs to be in contact with the to-be-joined members 2 at least partially, and a gap may be formed between the shoulder 90 and the to-be-joined members 2 to some extent depending on a relationship with a surface shape of the to-be-joined members 2. However, the shoulder 90 preferably comes into contact with the to-be-joined members 2 without a gap to press a metal material overflowing due to the friction stir welding and prevent formation of a weld flash. Moreover, the shoulder 90 may be inserted into the to-be-joined members 2 to some extent. However, the shoulder 90 is preferably inserted at such a level that no recess portion is formed after the joining due to the contact between the to-be-joined members 2 and the shoulder 90, and is preferably not deeply inserted into the to-be-joined members 2.

The second restriction member 110 is a member that restricts movement of the second member 92 toward the base end side of the rotating shaft 12 relative to the first member 91 beyond a predetermined range as shown in FIG. 8. In the present embodiment, the second restriction member 110 is fixed to the base end portion 92*b* of the second member 92. Although the shape of the second restriction member 110 is not limited to a particular shape, the second restriction member 110 has a cylindrical shape in the present embodiment. The second restriction member 110 is made of a material that is a metal, a resin, rubber or the like and that is relatively hard to withstand reaction force in the friction stir welding. The second restriction member 110 restricts the movement of the second member 92 in the axial direction such that an amount of deformation occurring in the second elastic member 99 with the movement of the second member 92 does not exceed the maximum deflection amount (maximum allowable amount) of the second elastic member 99.

According to such a configuration, the distal end surface of the shoulder 90 and the stir pin 50 can be moved relative to each other, and the second elastic member 99 enables the load control of the shoulder 90. Accordingly, the accuracy of the load control of the shoulder 90 can be further improved. Moreover, the shoulder 90 of the present modified example may be configured such that a not-shown holding unit is fixed to the outer peripheral surface of the first member 91, and the holding unit holds the shoulder 90 and the second member 92 in the not-rotating state.

Moreover, the rotating tool 1B according to the present embodiment includes the second restriction member 110 that restricts the movement of the second member 92 toward the base end side relative to the first member 91. More specifically, when the to-be-joined members 2 press the second elastic member 99 via the second member 92, the second restriction member 110 comes into contact with the intermediate end surface 91*a* of the first member 91 before the deflection amount of the second elastic member 99 reaches the maximum deflection amount. The second restriction member 110 thereby restricts the movement of the second member 92 within a range in which the amount of deformation occurring in the second elastic member 99 does not exceed the maximum deflection amount of the second elastic member 99 in the insertion of the rotating tool 1B at which the generated reaction force (load) is the largest and at a position where the shape of the to-be-joined members 2 greatly changes. Accordingly, it is possible to avoid the case where the second elastic member 99 exceeds its limit and deforms even when the to-be-joined members 2 are relatively hard and large load is required. This enables pressing of the relatively-hard to-be-joined members 2 with the shoulder 90 and can also prevent breakage of the rotating tool 1B.

Moreover, the second member 92 (shoulder 90) presses the to-be-joined members 2 in the state where the second member 92 restricted by the second restriction member 110 is supported by the second restriction member 110 (state where the second restriction member 110 is in contact with the first member 91 and the second member 92 and is sandwiched therebetween), and load applied by the joining device is applied to the second member 92 via the second restriction member 110. The to-be-joined members 2 can be thereby pressed with the second member 92.

Then, in the steady state, the generated reaction force (load) is reduced, the support of the second member 92 by the second restriction member 110 is cancelled, and the second member 92 not restricted by the second restriction member 110 is allowed to move in the axial direction.

In this case, biasing of the second member 92 toward the distal end side by the second elastic member 99 causes the second member 92 to press the to-be-joined members 2. Specifically, setting the second elastic member 99 in consideration of the joining conditions such as the to-be-joined members 2 and the joining mode enables quasi-load control using the second elastic member 99 in which the second member 92 is pressed at desired stress.

Moreover, the second elastic member 99 preferably has an outer diameter and a free length as small (short) as possible to prevent an increase in the size of the rotating tool 1B. The smaller the free length of the second elastic member 99 is, the larger the spring constant is, provided that the outer diameter is constant. Accordingly, insertion is facilitated also into the relatively-hard to-be-joined members 2. However, an increase of the spring constant increases the generated reaction force (load) with respect to a change amount, and the robustness thus decreases. Specifically, if the spring constant is increased, the second member 92 is more likely to be affected by the second elastic member 99. Accordingly, there is a problem in which operations of the second member 92 become unstable (less controllable) in the steady state.

In this respect, according the present embodiment, since the second restriction member 110 restricts the movement of the second member 92, force can be transmitted to the second member 92 via the second restriction member 110 without an increase of the spring constant of the second elastic member 99. This allows the second member 92 to press also the relatively-hard to-be-joined members 2. Moreover, since the spring constant of the second elastic member 99 does not have to be increased by an amount corresponding to provision of the second restriction member 110, the degree of freedom in design of the second elastic member 99 increases, and it is possible to improve the robustness in the steady state and stably control the second member 92.

Note that the second modified example is not limited to the above-mentioned configuration, and can be changed as appropriate. For example, although the second restriction member 110 is provided in the second member 92 in the second modified example, the second restriction member 110 may be provided on the intermediate end surface 91a of the first member 91. Bringing the second restriction member 110 and the base end portion 92b of the second member 92 into contact with each other before the second elastic member 99 reaches the maximum deflection amount can prevent the second elastic member 99 from exceeding the maximum deflection amount and deforming. Moreover, the second restriction member 110 may have a ring shape, and be loosely fitted between the first member 91 and the second member 92.

Moreover, although the second restriction member 110 is provided in the second member 92 in the second modified example, the second restriction member 110 may be provided in a bottom portion 95a of the hollow portion 95 in the second member 92. Bringing the second restriction member 110 and the protruding portion 94 into contact with each other before the second elastic member 99 reaches the maximum deflection amount can prevent the second elastic member 99 from exceeding the maximum deflection amount and deforming.

Furthermore, although the second restriction member 110 is provided in the second member 92 in the second modified example, the second restriction member 110 may be provided in an end portion (lower end portion) of the protruding portion 94. Bringing the second restriction member 110 and the bottom portion 95a of the hollow portion 95 into contact with each other before the second elastic member 99 reaches the maximum deflection amount can prevent the second elastic member 99 from exceeding the maximum deflection amount and deforming.

Moreover, although the second restriction member 110 is provided in the second member 92 in the second modified example, the second restriction member 110 may be provided on an outer peripheral surface of the protruding portion 94 on the distal end side. Furthermore, a groove portion that allows movement of the second restriction member 110 in the axial direction may be provided on an inner peripheral surface of the second member 92. Bringing the second restriction member 110 and a groove wall of the groove portion into contact with each other before the second elastic member 99 reaches the maximum deflection amount can prevent the second elastic member 99 from exceeding the maximum deflection amount and deforming. Note that the groove portion in the second member 92 and the second elastic member 99 may be achieved by the key grooves 97 and the keys 96.

Furthermore, although the second restriction member 110 is provided in the second member 92 in the second modified example, the second restriction member 110 may be provided on an outer peripheral surface (side surface portion) of the protruding portion 94 on the base end side. Bringing the second restriction member 110 and the base end portion 92b of the second member 92 into contact with each other before the second elastic member 99 reaches the maximum deflection amount can prevent the second elastic member 99 from exceeding the maximum deflection amount and deforming.

4. Second Embodiment

Figure 9:
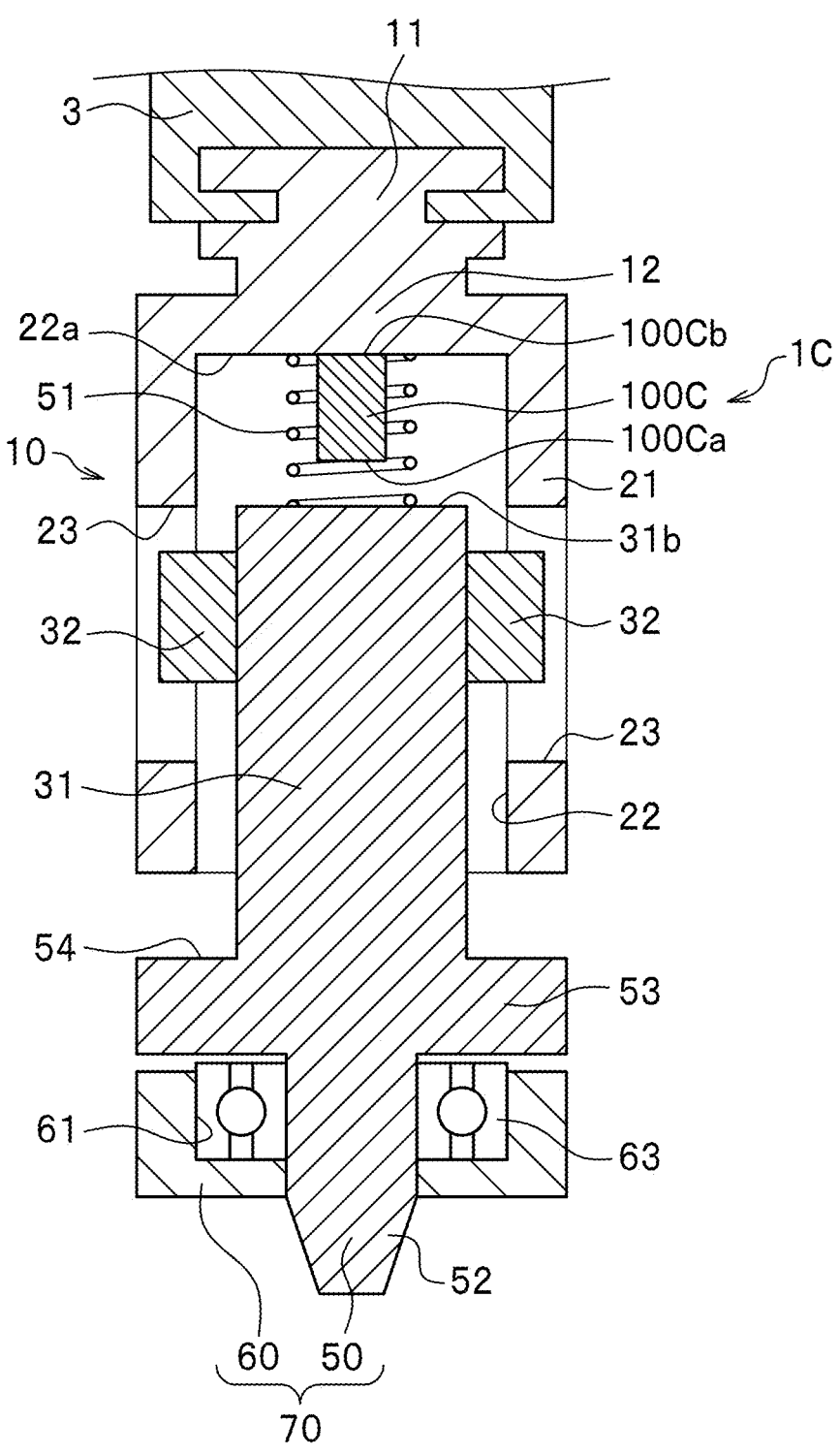
FIG. 9 is a cross-sectional view showing a rotating tool according to a second embodiment of the present invention.

Next, a rotating tool 1C according to a second embodiment is explained with reference to FIG. 9. The rotating tool 1C according to the second embodiment includes the stir pin 50, the first elastic member 51, a first restriction member 100C, and the main body 10 including the holder 21 and the slide shaft 31. Since basic configurations are the same as those in the above-mentioned embodiment, the basic configurations are denoted by the same reference numerals, and explanation thereof is omitted.

The first restriction member (first base end side fixed restriction member) 100C according to the present embodiment is provided by being fixed to the bottom portion 22a of the holder 21. Specifically, a base end portion 100Cb of the first restriction member 100C and the bottom portion 22a are constantly connected to each other. Although specific drawings are omitted, with reference to FIG. 2, a distal end portion 100Ca of the first restriction member 100C and the base end portion 31b of the slide shaft 31 come into contact with each other before the first elastic member 51 reaches the maximum deflection amount, and movement of the slide shaft 31 and the stir pin 50 (assembly 70) toward the base end side can be restricted.

The present embodiment can also provide effects substantially the same as those in the first embodiment. In addition, according to the present embodiment, the first restriction member 100C is provided in the bottom portion 22a of the holder 21, and this can avoid the case where the restriction member and the first elastic member 51 come into contact with each other due to free moving of the restriction member inside the holder 21. Moreover, since the first restriction member 100C can be fixed at a fixed position, the distal end portion 100Ca of the first restriction member 100C and the base end portion 31b of the slide shaft 31 can be brought into contact at a certain position, and the rotating tool 1C can receive the reaction force generated with the insertion of the rotating tool 1C at a predetermined position, and perform a stable operation.

5. Third Embodiment

Figure 10:
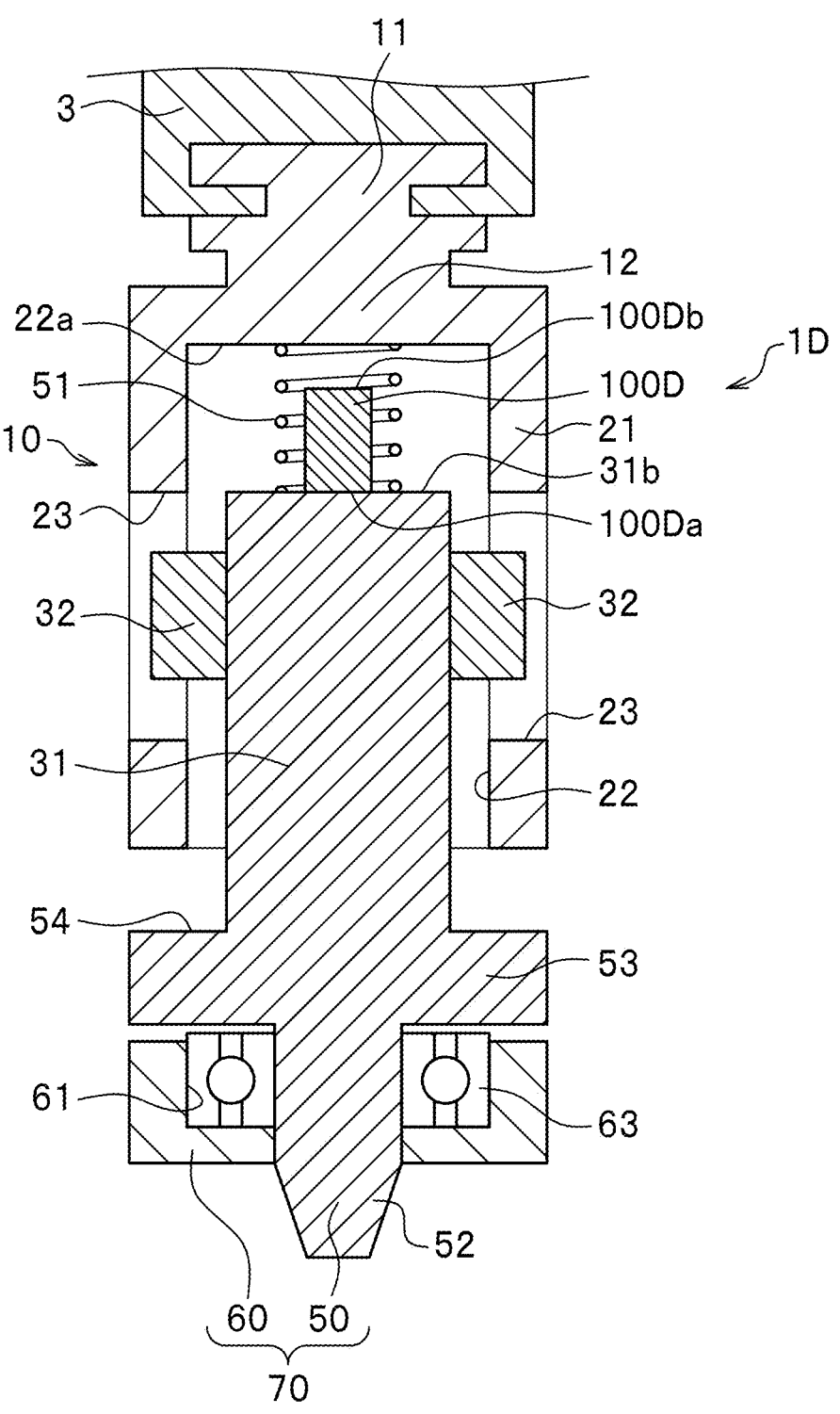
FIG. 10 is a cross-sectional view showing a rotating tool according to a third embodiment of the present invention.

Next, a rotating tool 1D according to a third embodiment is explained with reference to FIG. 10. The rotating tool 1D according to the third embodiment includes the stir pin 50, the first elastic member 51, a first restriction member 100D, and the main body 10 including the holder 21 and the slide shaft 31. Since basic configurations are the same as those in the above-mentioned embodiments, the basic configurations are denoted by the same reference numerals, and explanation thereof is omitted.

The first restriction member (first distal end side fixed restriction member) 100D according to the present embodiment is provided by being fixed to the slide shaft 31. Specifically, a distal end portion 100Da of the first restriction member 100D and the base end portion 31b of the slide shaft 31 are constantly connected to each other. Although specific drawings are omitted, with reference to FIG. 2, a base end portion 100Db of the first restriction member 100D and the bottom portion 22a of the holder 21 come into contact with each other before the first elastic member 51 reaches the maximum deflection amount, and the movement of the slide shaft 31 and the stir pin 50 (assembly 70) toward the base end side can be restricted.

The present embodiment can also provide effects substantially the same as those in the first embodiment. In addition, according to the present embodiment, the first restriction member 100D is provided in the slide shaft 31, and this can avoid the case where the restriction member and the first elastic member 51 come into contact with each other due to free moving of the restriction member inside the holder 21. Moreover, since the first restriction member 100D can be fixed at a fixed position, the base end portion 100Db of the first restriction member 100D and the bottom portion 22a of the holder 21 can be brought into contact at a certain position, and the rotating tool 1D can receive the reaction force generated with the insertion of the rotating tool 1D at a predetermined position, and perform a stable operation.

6. Fourth Embodiment

Figure 11:
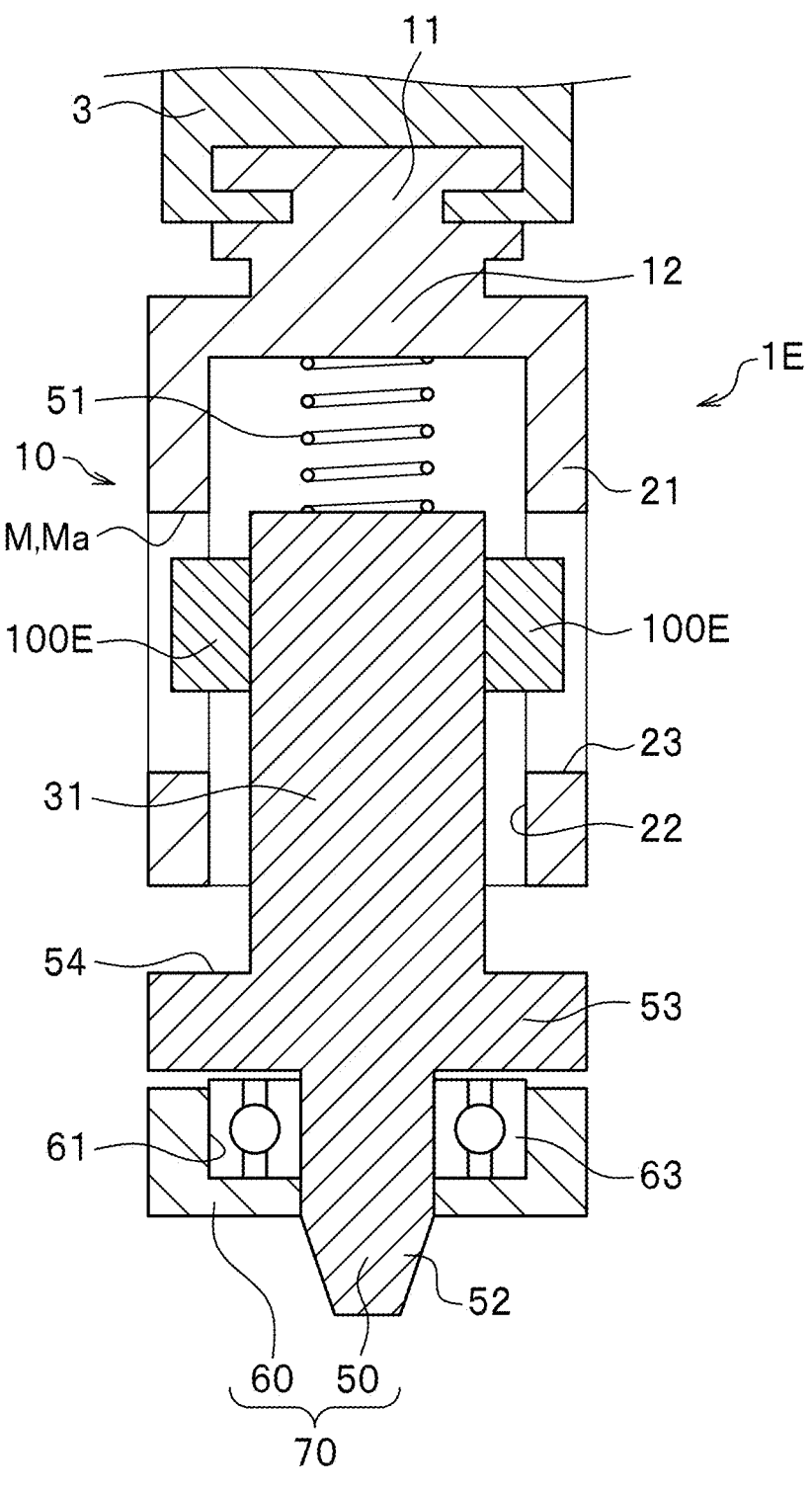
FIG. 11 is a cross-sectional view showing a rotating according to a fourth embodiment of the present invention.
Figure 12:
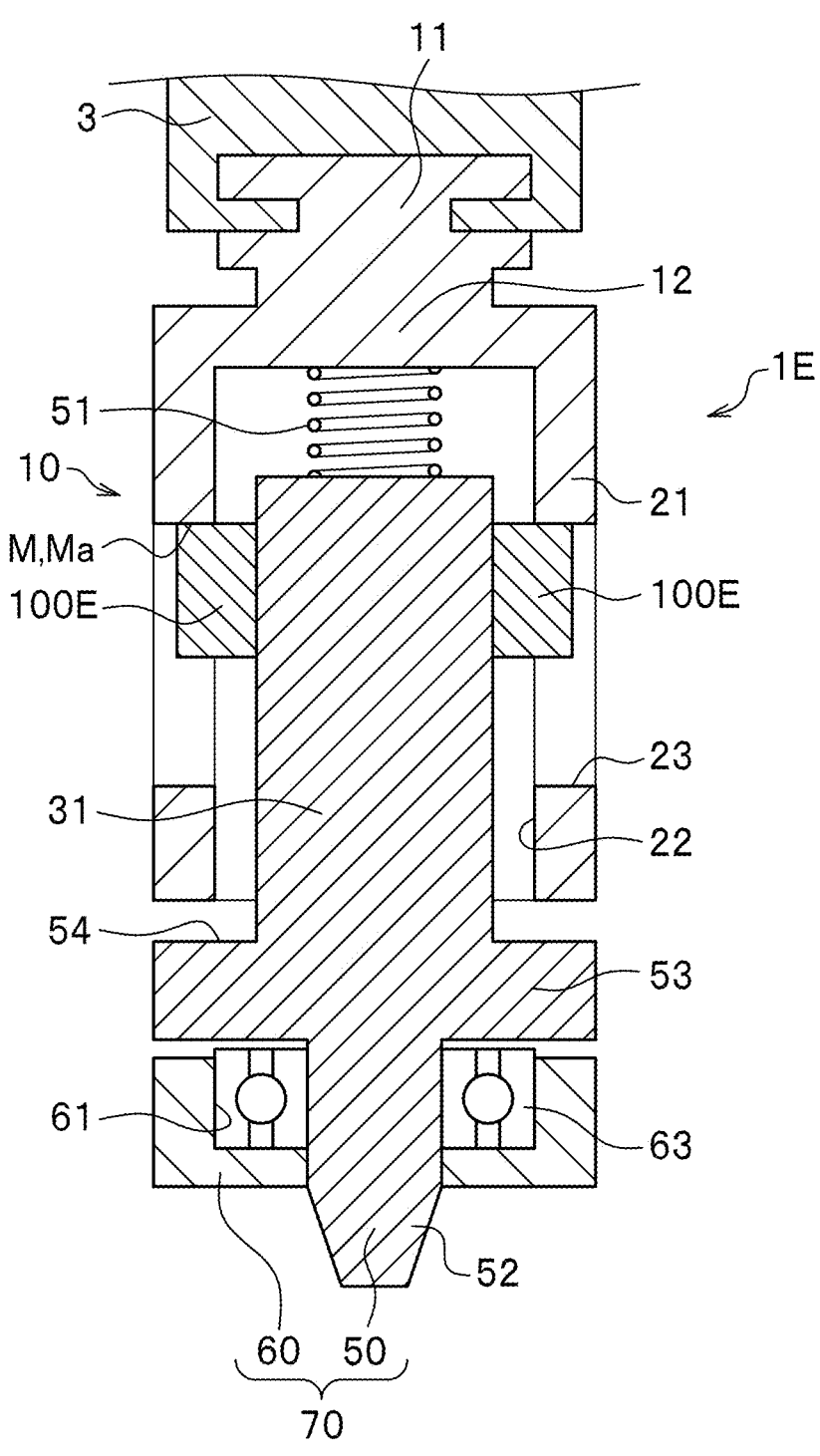
FIG. 12 is a cross-sectional view showing a most-contracted state of the rotating tool according to the fourth embodiment.

Next, a rotating tool 1E according to a fourth embodiment is explained with reference to FIGS. 11 and 12. The rotating tool 1E according to the fourth embodiment includes the stir pin 50, the first elastic member 51, first restriction members 100E, and the main body 10 including the holder 21 and the slide shaft 31. Since basic configurations are the same as those in the above-mentioned embodiments, the basic configurations are denoted by the same reference numerals, and explanation thereof is omitted.

The first restriction members (first intermediate restriction members) 100E according to the present embodiment are provided by being fixed to the outer peripheral surface (side surface portion) of the slide shaft 31. The first restriction members 100E are plate-shaped members protruding out in a radially-outward direction, perpendicularly from the outer peripheral surface of the slide shaft 31. Particularly, the first restriction members 100E are provided on an outer peripheral surface of the slide shaft 31 on the base end side in the axial direction. One or multiple first restriction members 100E may be formed. The first restriction members 100E are formed to move inside through-holes M in the axial direction with the movement of the slide shaft 31, the through-holes M penetrating the holder 21 in a radially-outward direction. As shown in FIG. 12, the first restriction members 100E and hole walls (intermediate portion of the holder) Ma of the through-holes M on the base end side come into contact with one another before the first elastic member 51 reaches the maximum deflection amount, and the movement of the slide shaft 31 and the stir pin 50 (assembly 70) toward the base end side can be restricted.

Note that, although the through-holes M of the holder 21 are set as the "intermediate portion" in the present embodiment, it is possible to set other portions of the holder 21 as the "intermediate portion" and bring the intermediate portion and the first restriction members 100E into contact with each other. Moreover, the configuration may be such that groove portions are provided instead of the through-holes M, and the first restriction members 100E move inside the groove portions. Furthermore, the through-holes M and the first restriction members 100E may be achieved by the key grooves 23 and the keys 32.

The present embodiment can also provide effects substantially the same as those in the first embodiment. In addition, according to the present embodiment, the first restriction members 100E are provided on the outer peripheral surface of the slide shaft 31, and can thereby avoid interference with the first elastic member 51 housed inside the holder 21. Accordingly, for example, even when the restriction members cannot be housed inside the holder 21 together with the elastic member due to effects of the structure, shape, operation, or function of the elastic member, the first restriction members 100E provided on the outer peripheral surface can restrict the movement of the assembly 70. Thus, the degree of freedom in design can be improved.

7. Fifth Embodiment

Figure 13:
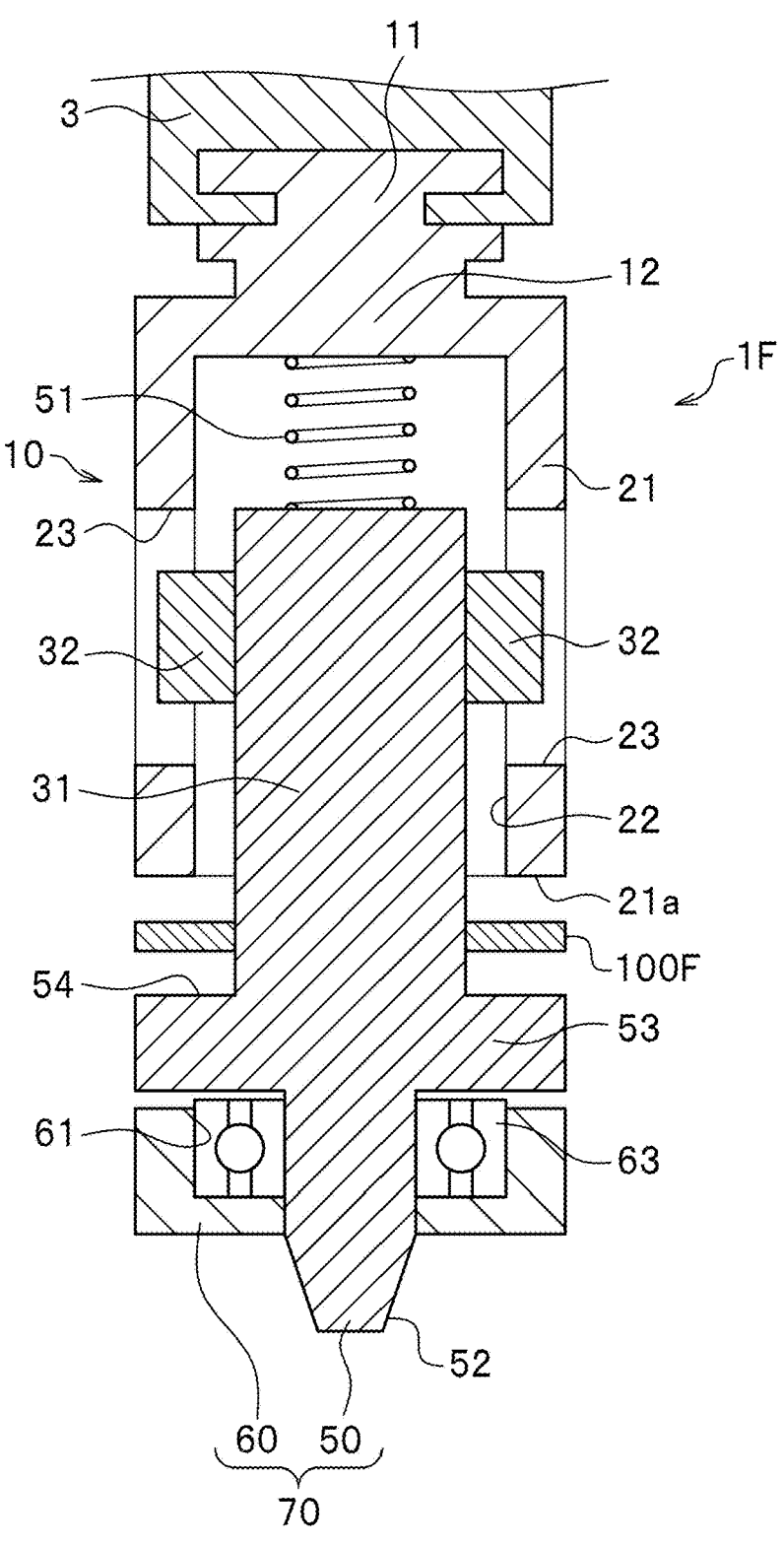
FIG. 13 is a cross-sectional view showing a rotating tool according to a fifth embodiment of the present invention.
Figure 14:
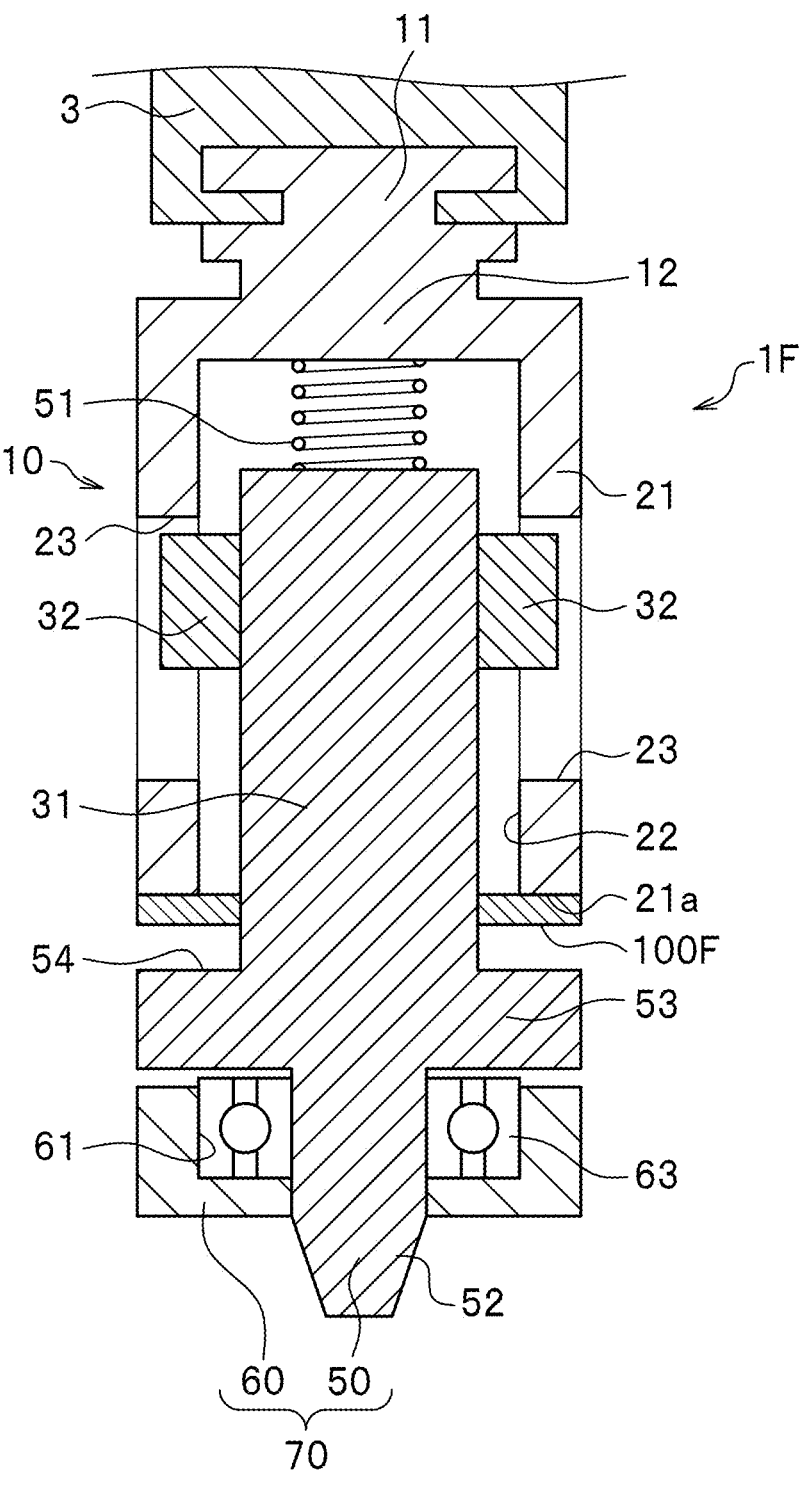
FIG. 14 is a cross-sectional view showing a most-contracted state of the rotating tool according to the fifth embodiment.

Next, a rotating tool 1F according to a fifth embodiment is explained with reference to FIGS. 13 and 14. The rotating tool 1F according to the fifth embodiment includes the stir pin 50, the first elastic member 51, and first restriction members 100F, and the main body 10 including the holder 21 and the slide shaft 31. Since basic configurations are the same as those in the above-mentioned embodiments, the basic configurations are denoted by the same reference numerals, and explanation thereof is omitted.

The first restriction members (first distal end side restriction members) 100F according to the present embodiment are provided by being fixed to the outer peripheral surface (side surface portion) of the slide shaft 31. Particularly, the first restriction members 100F are provided on an outer peripheral surface of the slide shaft 31 on the distal end side. The first restriction members 100F are plate-shaped members protruding out in the radially-outward direction, perpendicularly from the outer peripheral surface of the slide shaft 31. One or multiple first restriction members 100F may be formed. As shown in FIG. 14, the first restriction members 100F and a distal end portion 21a of the holder 21 come into contact with one another before the first elastic member 51 reaches the maximum deflection amount, and the movement of the slide shaft 31 and the stir pin 50 (assembly 70) toward the base end side can be restricted.

The present embodiment can also provide effects substantially the same as those in the first embodiment. In addition, according to the present embodiment, the first restriction members 100F are provided on the outer peripheral surface of the slide shaft 31, and can thereby avoid interference with the first elastic member 51 housed inside the holder 21. Accordingly, for example, even when the restriction members cannot be housed inside the holder 21 together with the elastic member due to effects of the structure, shape, operation, or function of the elastic member, the first restriction members 100F provided on the outer peripheral surface can restrict the movement of the assembly 70. Thus, the degree of freedom in design can be improved. Moreover, according to the present embodiment, in contrast to the case where the through-holes M and the first restriction members 100E are achieved by the key grooves 23 and the keys 32 and the first restriction members 100E and the key grooves 23 come into contact with one another, application of load to the key grooves 23 can be avoided because the first restriction members 100F and the distal end portion 21*a* of the holder 21 come into contact with one another.

8. Sixth Embodiment

Figure 15:
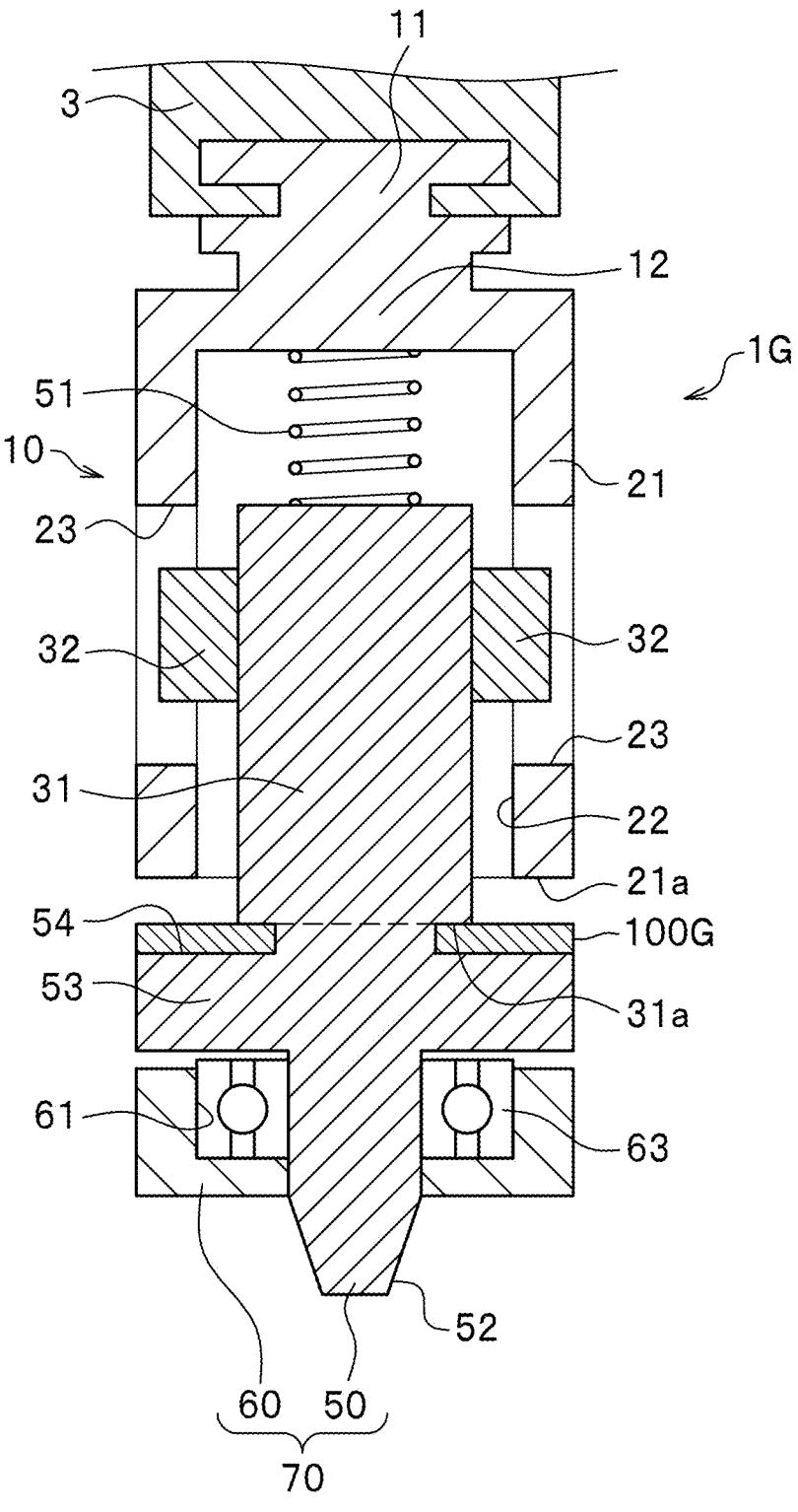
FIG. 15 is a cross-sectional view showing a rotating tool according to a sixth embodiment of the present invention.
Figure 16:
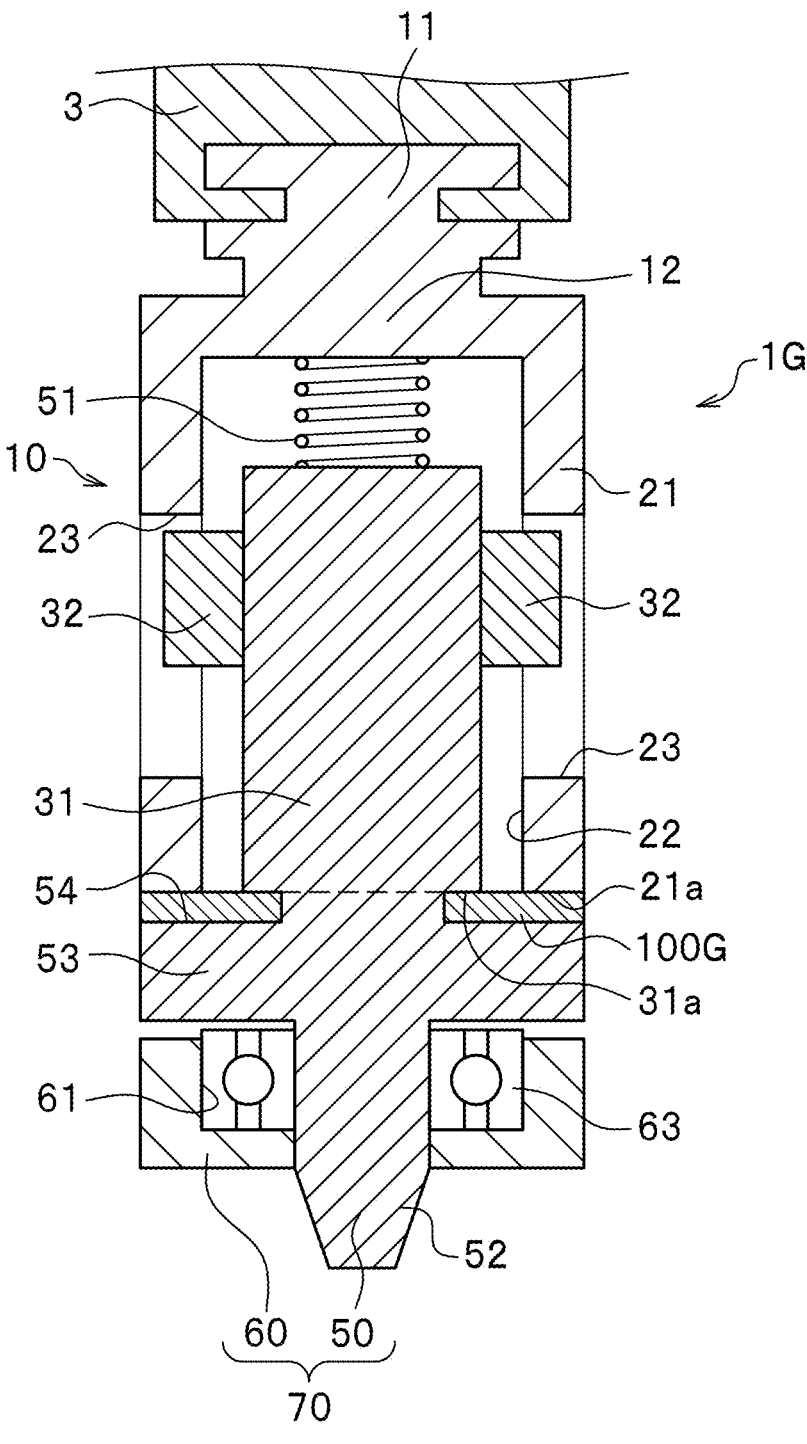
FIG. 16 is a cross-sectional view showing a most-contracted state of the rotating tool according to the sixth embodiment.

Next, a rotating tool 1G according to a sixth embodiment is explained with reference to FIGS. 15 and 16. The rotating tool 1G according to the sixth embodiment includes the stir pin 50, the first elastic member 51, first restriction members 100G, and the main body 10 including the holder 21 and the slide shaft 31. Since basic configurations are the same as those in the above-mentioned embodiments, the basic configurations are denoted by the same reference numerals, and explanation thereof is omitted.

The first restriction members (first distal end surface restriction members) 100G according to the present embodiment are provided by being fixed to a distal end portion (distal end surface) 31*a* of the slide shaft 31. The first restriction members 100G are plate-shaped members protruding in the radially-outward direction, perpendicularly from the distal end portion (distal end surface) 31*a* of the slide shaft 31. The first restriction members 100G protrude outward beyond the outer peripheral surface of the slide shaft 31. One or multiple first restriction members 100G may be formed. As shown in FIG. 16, the first restriction members 100G and the distal end portion 21*a* of the holder 21 come into contact with one another before the first elastic member 51 reaches the maximum deflection amount, and the movement of the slide shaft 31 and the stir pin 50 (assembly 70) toward the base end side can be restricted.

The present embodiment can also provide effects substantially the same as those in the first embodiment. In addition, according to the present embodiment, the first restriction members 100G are provided in the distal end portion of the slide shaft 31, and can thereby avoid interference with the first elastic member 51 housed inside the holder 21. Accordingly, for example, even when the restriction members cannot be housed inside the holder 21 together with the elastic member due to effects of the structure, shape, operation, or function of the elastic member, the first restriction members 100G provided in the distal end portion can restrict the movement of the assembly 70. Thus, the degree of freedom in design can be improved. Moreover, according to the present embodiment, in contrast to the case where the through-holes M and the first restriction members 100E are achieved by the key grooves 23 and the keys 32 and the first restriction members 100E and the key grooves 23 come into contact with one another, application of load to the key grooves 23 can be avoided because the first restriction members 100G and the distal end portion 21*a* of the holder 21 come into contact with one another.

9. Seventh Embodiment

Figure 17:
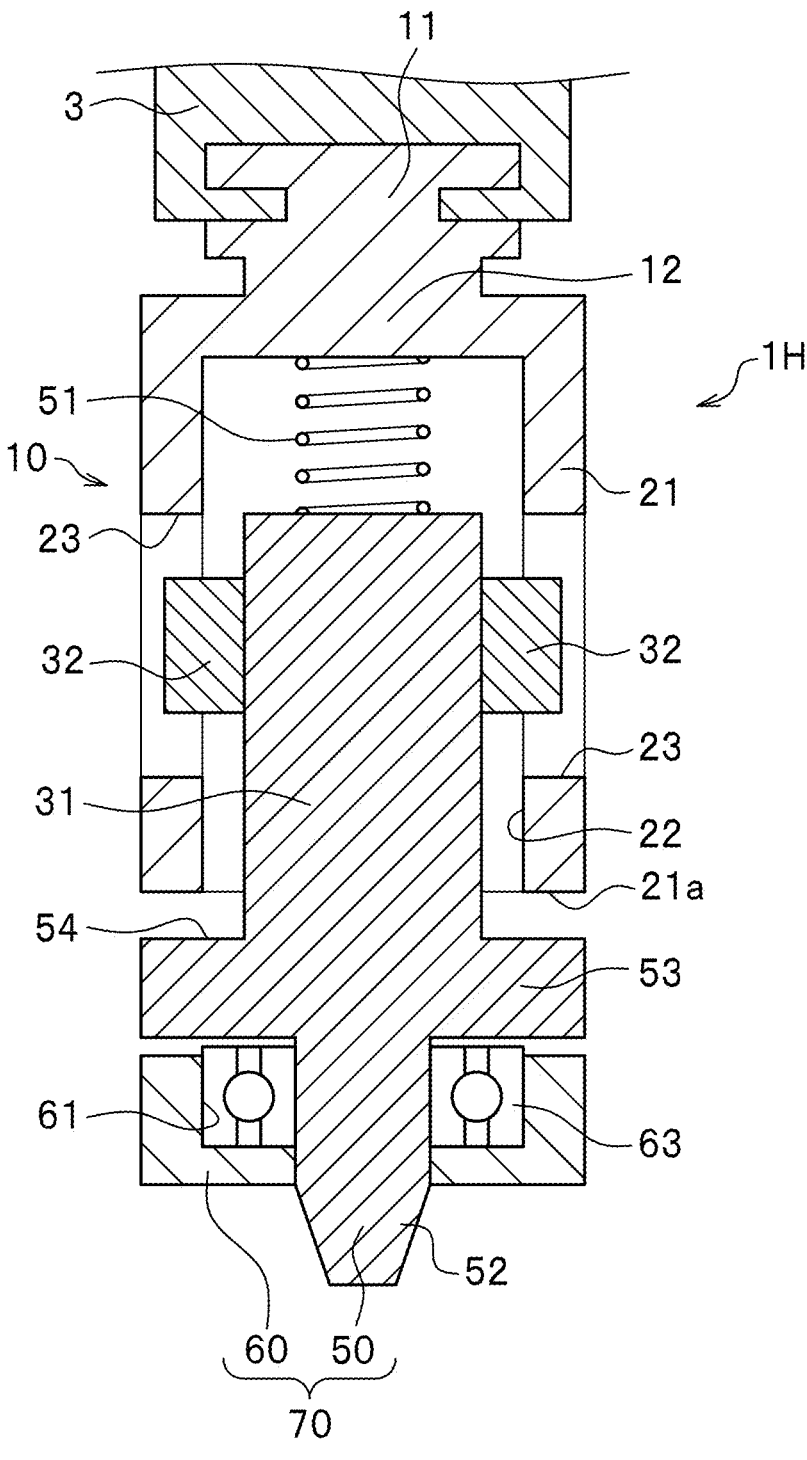
FIG. 17 is a cross-sectional view showing a rotating tool according to a seventh embodiment of the present invention.
Figure 18:
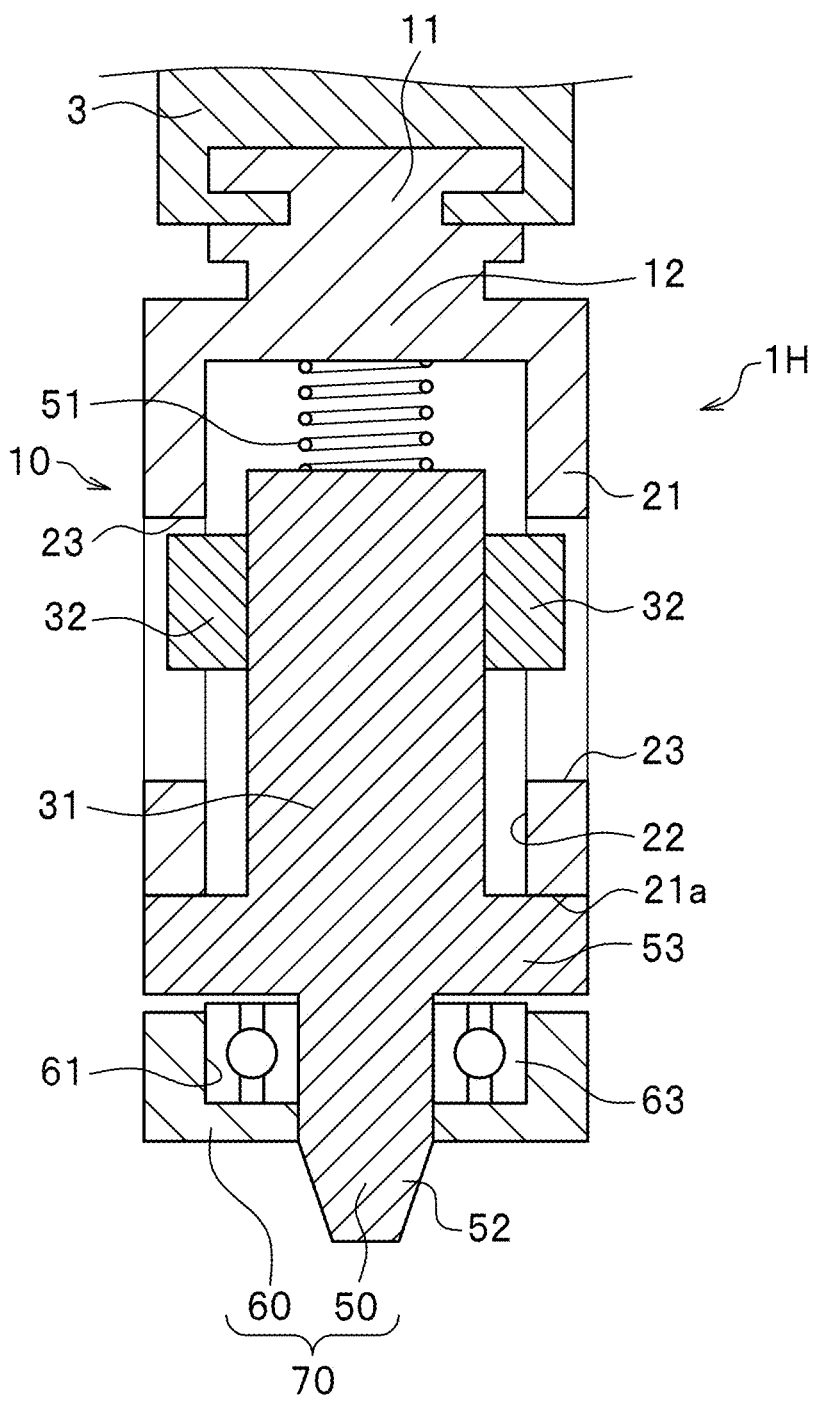
FIG. 18 is a cross-sectional view showing a most-contracted state of the rotating tool according to the seventh embodiment.

Next, a rotating tool 1H according to a seventh embodiment is explained with reference to FIGS. 17 and 18. The rotating tool 1H according to the seventh embodiment includes the stir pin 50, the first elastic member 51, and the main body 10 including the holder 21 and the slide shaft 31. Since basic configurations are the same as those in the above-mentioned embodiments, the basic configurations are denoted by the same reference numerals, and explanation thereof is omitted.

The stir pin 50 according to the present embodiment is formed of the distal end portion 52 and the flange portion 53. The flange portion 53 has a larger diameter than the distal end portion 52. The outer diameter of the flange portion 53 is larger than the inner diameter of the slide shaft 31. Moreover, the outer diameter of the flange portion 53 is larger than the inner diameter of the housing recess portion 22 in the holder 21. As shown in FIG. 18, the flange portion 53 of the stir pin 50 and the distal end portion 21*a* of the holder 21 come into contact with each other before the first elastic member 51 reaches the maximum deflection amount, and the movement of the slide shaft 31 and the stir pin 50 (assembly 70) toward the base end side can be restricted. In other words, the stir pin 50 itself is the restriction member in the present embodiment.

The present embodiment can also provide effects substantially the same as those in the first embodiment. In addition, according to the present embodiment, the stir pin 50 functions as the restriction member, and can thereby avoid interference with the first elastic member 51 housed inside the holder 21. Accordingly, for example, even when the restriction member cannot be housed inside the holder 21 together with the elastic member due to effects of the structure, shape, operation, or function of the elastic member, the stir pin 50 can restrict the movement of the stir pin 50 itself and the assembly 70. Thus, the degree of freedom in design can be improved.

10. Others

Although the embodiments of the present invention have been explained above, appropriate design changes can be made within such a scope that the changes are not against the spirit of the present invention. In the above embodiments, the key grooves 23 are formed in the holder 21, and the keys 32 are formed in the slide shaft 31. However, the present invention is not limited to this configuration. The configuration may be such that the keys are formed in the holder 21, and the key grooves are formed in the slide shaft 31.

Moreover, in the above embodiments, the case where the rotating tool 1 includes the holding unit 80 fixed to the shoulder 60 and this holding unit is connected to the joining device to hold the shoulder 60 in the not-rotating state is described as an example. However, the present invention is not limited to this configuration. The configuration may be such that the joining device 3 includes a rod-shaped arm member fixed to the fixed system of the joining device 3 as a second holding unit and this second holding unit is connected to the shoulder 60 of the rotating tool 1 to hold the shoulder 60 in the not-rotating state. This second holding unit is included in the joining device 3. Moreover, the configuration may be as follows. The rotating tool 1 includes a rod-shaped arm member fixed to the shoulder 60 as the holding unit 80, the joining device 3 includes a rod-shaped arm member fixed to the fixed system of the joining device 3 as the second holding unit, and both holding units are connected to each other to hold shoulder 60 in the not-rotating state. These holding units are included in the rotating tool 1 and the joining device 3. As described above, the holding unit included in the rotating tool 1 and the second holding unit included in the joining device 3 and configured to operate by cooperating with the holding unit included in the rotating tool 1 may be provided at the same time. As described above, including the second holding unit configured to hold the shoulder 60 in the not-rotating state in the joining device 3 can facilitate the holding of the shoulder 60 in the not-rotating state and further improve the finish of the surface of the to-be-joined members 2 after the friction stir welding.

Furthermore, although the first elastic member 51 is arranged between the slide shaft 31 and the bottom portion 22a of the housing recess portion 22 in the above-mentioned embodiments, the first elastic member 51 may be arranged at any location as long as it is a location where the first elastic member 51 biases the assembly 70 toward the distal end side. Moreover, the arrangement of the restriction members may be changed depending on the arrangement of the first elastic member 51. For example, the first elastic member 51 may be arranged between the holder 211 and the flange portion 53, on the outer periphery of the slide shaft 31. In such a case, the first elastic member 51 is located near the intermediate portion of the slide shaft 31 and the stir pin 50, and the first elastic member 51 acts evenly in the circumferential direction of the slide shaft 31. Accordingly, even if the slide shaft 31 moves, the first elastic member 51 stably biases the assembly 70 toward the distal end side. Thus, accuracy of load control of the stir pin 50 and the shoulder 60 can be improved.

Moreover, in the second modified example, the case where the distal end portion 52 of the stir pin 50 protrudes downward beyond the distal end portion (distal end surface) 92a of the second member 92 is explained as an example. However, the present invention is not limited to this configuration. The distal end portion 92a of the second member 92 may protrude downward beyond the distal end portion 52 of the stir pin 50 in the state where the rotating tool 1B is not in contact with the to-be-joined members 2. When the rotating tool 1B is moved away from the to-be-joined members 2 in the pull-out of the rotating tool 1B from the to-be-joined members 2, the stir pin 50 thereby disengages from the to-be-joined members 2 before the second member 92, in the state where the second member 92 presses the to-be-joined members 2. In this case, pulling out the stir pin 50 while maintaining the state where the second member 92 presses the to-be-joined members 2 allows the shoulder member 92 to press the metal material that has become fluid and is overflowing due to the insertion of the stir pin 50. Accordingly, a pull-out hole formed in the pull-out of the stir pin 50 can be more easily filled with the metal material pressed by the second member 92. Particularly, formation of the pull-out hole can be more easily prevented in the case where spot friction stirring is performed in which joining is performed at a position where the rotating tool 1B is inserted in the friction stir welding and the rotating tool 1B is pulled out without being moved from the insertion position.

Moreover, in the above-mentioned embodiments, the case where the first restriction member 100 has the cylindrical column shape and is arranged in the hollow portion of the first elastic member 51 is explained as an example. The first restriction member may have a tubular shape with an inner diameter larger than the outer diameter of the first elastic member 51. In this case, the configuration may be such that the first elastic member 51 is arranged inside the first restriction member, and the first restriction member is arranged to cover the outside of the first elastic member 51.

REFERENCE SIGNS LIST 1 rotating tool
2 to-be-joined members 3 joining device
10 main body
11 fixation portion
12 rotating shaft
21 holder
23 key groove
31 slide shaft
32 key
50 stir pin
51 first elastic member
60 shoulder
61 hollow portion
63 bearing
65 shoulder
70 assembly
80, 85 holding unit
90 shoulder
99 second elastic member
100 first restriction member
110 second restriction member

The invention claimed is:

1. A rotating tool used in a joining device configured to perform friction stir welding of to-be-joined members, the rotating tool comprising:
   a main body including a fixation portion that is attached and fixed to the joining device and a rotating shaft that transmits rotating force from the joining device;
   a stir pin arranged in the main body to be rotatable by receiving the rotating force from the main body and be movable in an axial direction of the rotating shaft, the stir pin configured to perform friction stirring on the to-be-joined members by being inserted into the to-be-joined members;
   a shoulder formed of a body separate from the stir pin and provided in the main body to receive no rotating force from the main body and be movable in the axial direction of the rotating shaft, the shoulder configured to press the to-be-joined members in a state where the shoulder is in contact with the to-be-joined members, the stir pin and the shoulder forming an assembly by being attached to be rotatable relative to each other and to move integrally in the axial direction of the rotating shaft;
   a first elastic member configured to bias the assembly toward a distal end side of the stir pin in the axial direction of the rotating shaft; and
   a first restriction member configured to restrict movement of the assembly toward a base end side in the axial direction of the rotating shaft, wherein
   the first restriction member restricts the movement of the assembly such that an amount of deformation occurring in the first elastic member with the movement of the assembly does not exceed a maximum allowable amount of the first elastic member.

2. The rotating tool according to claim 1, wherein
   the main body further includes a holder that has a hollow tube shape and that is attached to the rotating shaft and a slide shaft that is housed in a center portion of the holder to be slidable in a rotating shaft direction and that rotates in synchronization with the holder,
   the assembly is provided at a distal end of the slide shaft,
   the slide shaft is biased toward a distal end side of the assembly via the first elastic member, and
   the first restriction member restricts movement of the slide shaft toward the base end side in the axial direction of the rotating shaft.

3. The rotating tool according to claim 1, further comprising:

a second elastic member configured to bias the shoulder toward the distal end side of the stir pin in the axial direction of the rotating shaft; and a second restriction member configured to restrict movement of the shoulder toward the base end side in the axial direction of the rotating shaft, wherein the second restriction member restricts the movement of the shoulder such that an amount of deformation occurring in the second elastic member with the movement of the shoulder does not exceed a maximum allowable amount of the second elastic member.

4. The rotating tool according to claim 2, wherein the first restriction member is provided in the holder, and the movement of the slide shaft is restricted by contact of a base end portion of the slide shaft and a bottom portion of the holder on the base end side with the first restriction member that occurs with the movement of the slide shaft.

5. The rotating tool according to claim 2, wherein the first restriction member is provided in a bottom portion of the holder on the base end side, and the movement of the slide shaft is restricted by contact of a base end portion of the slide shaft with the first restriction member that occurs with the movement of the slide shaft.

6. The rotating tool according to claim 2, wherein the first restriction member is provided in a base end portion of the slide shaft, and the movement of the slide shaft is restricted by contact of a bottom portion of the holder on the base end side with the first restriction member that occurs with the movement of the slide shaft.

7. The rotating tool according to claim 2, wherein the first restriction member is provided on an outer peripheral surface of the slide shaft, and the movement of the slide shaft is restricted by contact of the first restriction member with an intermediate portion of the holder that occurs with the movement of the slide shaft.

8. The rotating tool according to claim 2, wherein the first restriction member is provided on an outer peripheral surface of the slide shaft, and the movement of the slide shaft is restricted by contact of the first restriction member with a distal end portion of the holder that occurs with the movement of the slide shaft.

9. The rotating tool according to claim 2, wherein the first restriction member is provided in a distal end portion of the slide shaft, and the movement of the slide shaft is restricted by contact of the first restriction member with a distal end portion of the holder that occurs with the movement of the slide shaft.

10. The rotating tool according to claim 2, wherein the stir pin is the first restriction member, and the movement of the slide shaft is restricted by contact of the stir pin with a distal end portion of the holder that occurs with the movement of the slide shaft.

11. A joining device comprising:

the rotating tool according to claim 1;

a power unit configured to output the rotating force to be transmitted to the rotating shaft of the rotating tool; and a position controller configured to hold the fixation portion of the rotating tool and perform position control of the rotating tool, wherein the joining device performs the friction stir welding on the to-be-joined members by causing the position controller to move the rotating tool such that the rotating tool is located at a predetermined height position relative to the to-be-joined members, and insert the stir pin into the to-be-joined members.

12. A joining method comprising performing friction stir welding on the to-be-joined members by moving the rotating tool according to claim 1 such that the rotating tool is located at a predetermined height position relative to the to-be-joined members, and inserting the stir pin into the to-be-joined members.

\* \* \* \* \*